(12) United States Patent
Yoshikawa

(10) Patent No.: US 9,995,589 B2
(45) Date of Patent: Jun. 12, 2018

(54) PATH PLAN GENERATING APPARATUS FOR MOBILE BODY

(71) Applicant: HONDA MOTOR CO., LTD., Tokyo (JP)

(72) Inventor: Taizo Yoshikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 15/398,965

(22) Filed: Jan. 5, 2017

(65) Prior Publication Data

US 2017/0241790 A1   Aug. 24, 2017

(30) Foreign Application Priority Data

Feb. 24, 2016   (JP) ................................ 2016-033029

(51) Int. Cl.
  *G01C 21/30*   (2006.01)
  *G01C 21/34*   (2006.01)
  *G01S 19/13*   (2010.01)

(52) U.S. Cl.
  CPC ..... *G01C 21/3446* (2013.01); *G01C 21/3415* (2013.01); *G01S 19/13* (2013.01)

(58) Field of Classification Search
  CPC . G01C 21/3446; G01C 21/3415; G01S 19/13; G05D 1/024; G05D 1/0236
  USPC .......... 701/411, 400, 301, 26; 700/250, 253, 700/245; 341/79; 382/103; 901/1, 49
  See application file for complete search history.

(56) References Cited

U.S. PATENT DOCUMENTS

| | | | | |
|---|---|---|---|---|
| 6,393,362 B1* | 5/2002 | Burns | .................. | G05D 1/0278 340/940 |
| 7,447,593 B2* | 11/2008 | Estkowski | ............. | G01O 21/20 700/250 |
| 8,825,209 B2* | 9/2014 | Kim | ........................ | B25J 9/1666 318/568.15 |
| 2008/0058987 A1* | 3/2008 | Ozick | ....................... | A47L 5/30 700/250 |
| 2011/0035050 A1* | 2/2011 | Kim | ........................ | B25J 9/1666 700/246 |
| 2011/0106306 A1* | 5/2011 | Kim | ........................ | B25J 9/1664 700/246 |
| 2012/0221237 A1* | 8/2012 | Jung | ..................... | G05D 1/0274 701/400 |
| 2013/0166134 A1* | 6/2013 | Shitamoto | .............. | G05D 1/024 701/26 |
| 2014/0121833 A1* | 5/2014 | Lee | ......................... | B25J 9/1666 700/255 |
| 2017/0057087 A1* | 3/2017 | Lee | ......................... | B25J 9/1666 |

FOREIGN PATENT DOCUMENTS

JP   2009-211571   9/2009

* cited by examiner

*Primary Examiner* — Shardul D Patel
(74) *Attorney, Agent, or Firm* — Rankin, Hill & Clark LLP

(57) ABSTRACT

A path plan generating apparatus 10 corrects an RRT path plan that an RRT path plan generating section 22 has generated by processing based on the RRT algorithm, by a path plan correcting section 23 by processing based on the potential method. If the corrected path plan becomes a path plan with which interference between the mobile body 1 and an obstacle A is unavoidable, the apparatus 10 causes the RRT path plan generating section 22 to generate a new RRT path plan.

8 Claims, 19 Drawing Sheets

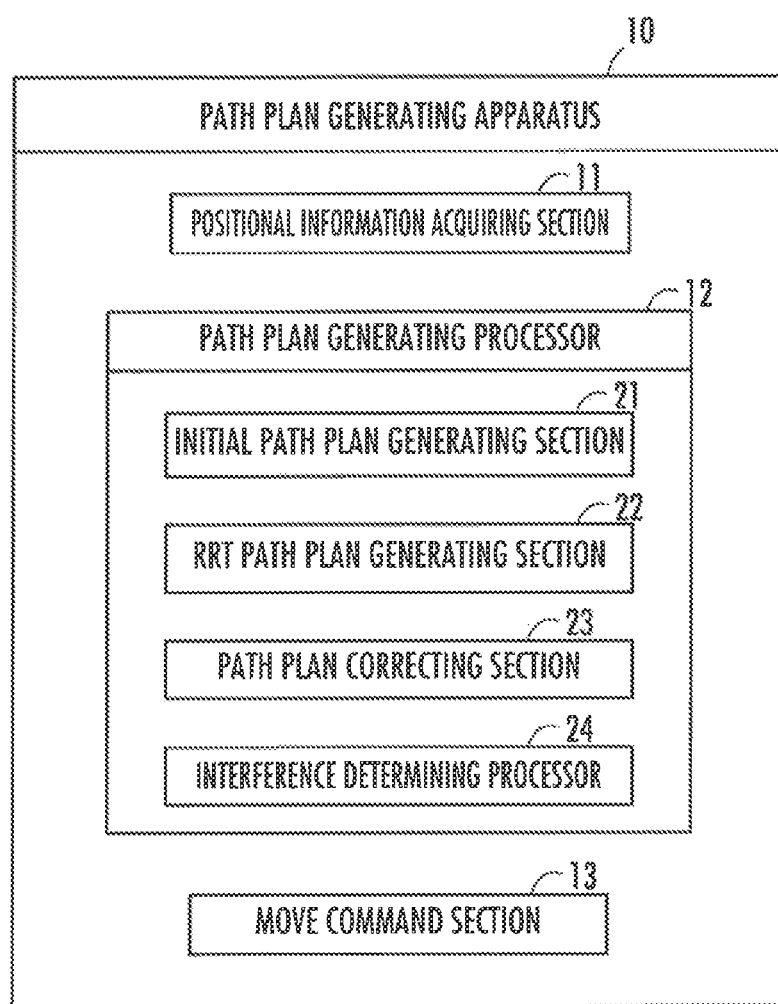

FIG.8A                    FIG.8B
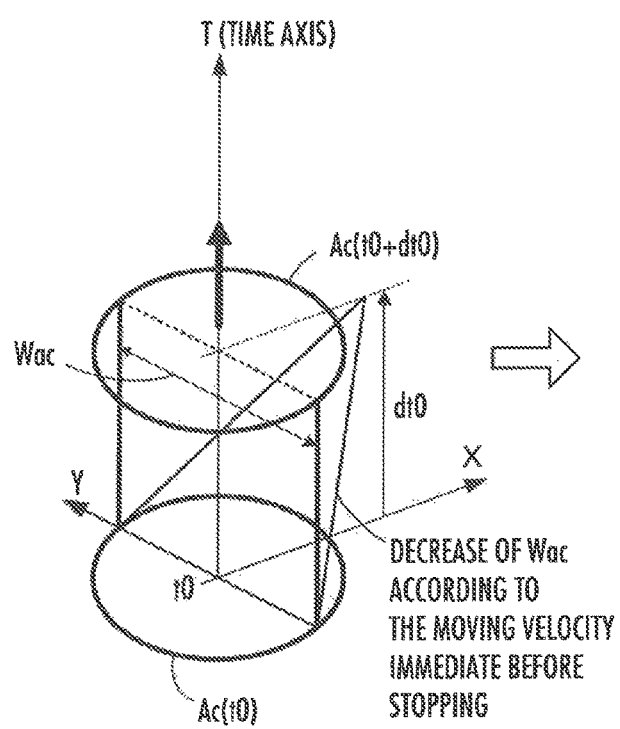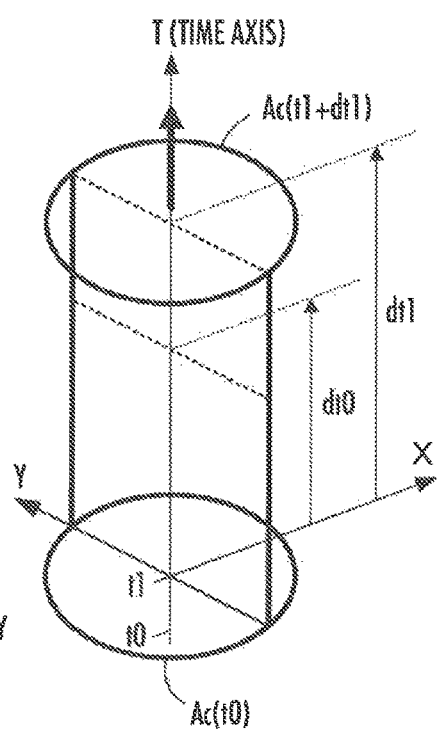

FIG.21
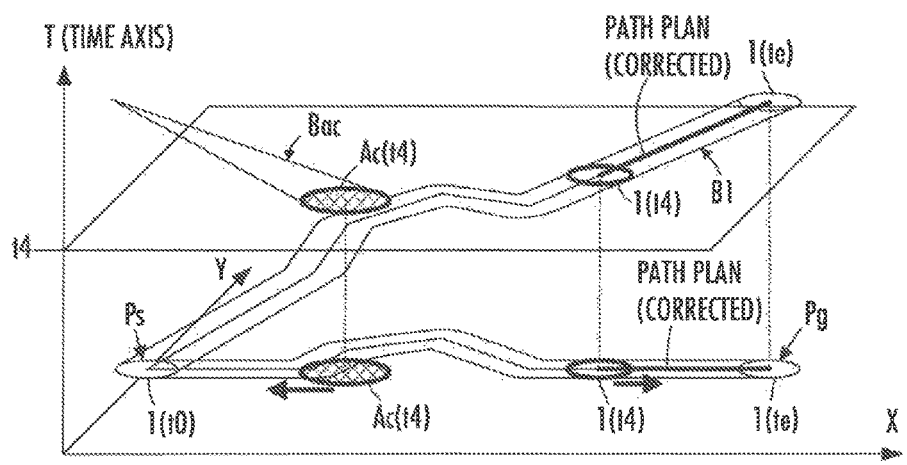
FIG.22A                    FIG.22B
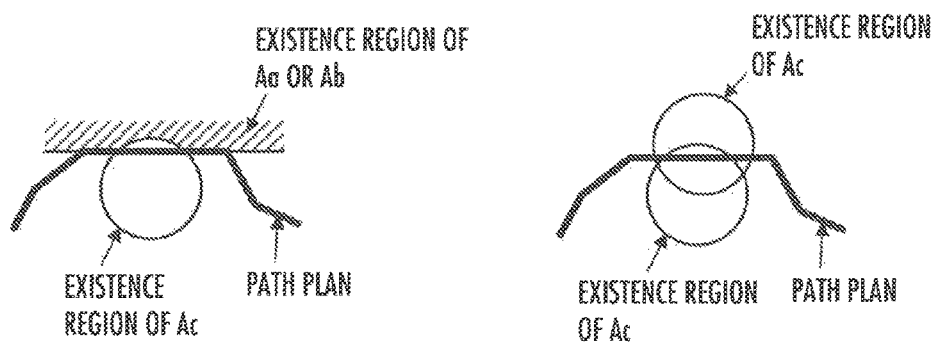

PATH PLAN GENERATING APPARATUS FOR MOBILE BODY

BACKGROUND OF THE INVENTION

Field of the Invention

The present invention relates to an apparatus which generates a path plan for a mobile body.

Description of the Related Art

As techniques for generating a path plan for a mobile body, conventionally, a Dijkstra's algorithm, a probabilistic roadmap method, a rapidly-exploring random tree (RRT) algorithm, a potential method, etc. are generally known.

These techniques individually have advantages and disadvantages. It is often difficult in various kinds of situations to generate a path plan that allows a mobile body to move appropriately.

For example, with the RRT algorithm, in a case where there is a mobile obstacle in an operating environment of the mobile body, it may be difficult to dynamically generate a path plan having high stability in response to a change in moving state of the mobile obstacle.

Further, for example, with the potential method, in a case where there occurs a situation where the potential value of the potential field locally becomes extremely small, it is highly likely that the path plan cannot be corrected appropriately.

As a technique for solving the problems of the conventional techniques as described above, a technique as described in Japanese Patent Application Laid-Open No. 2009-211571, for example, has been proposed. With this technique, first, a basic path plan is generated in accordance with the RRT algorithm. Further, with respect to a multi mass point system in which the nodes in the basic path plan are regarded as mass points, a plurality of constraints regarding forces acting on the mass points are set. A dynamic simulation in the multi mass point system is then carried out, to generate a path plan that may fulfill the constraints.

SUMMARY OF THE INVENTION

With the technique in the above application, however, the path plan that may fulfill the constraints is generally generated through repeated dynamic simulations, so it takes time to generate the path plan. Thus, in an environment where a plurality of mobile obstacles are moving in the operating environment of the mobile body, or in an environment where there is a mobile obstacle (for example, a person) whose moving path is difficult to predict with precision, it is difficult to quickly and appropriately update the path plan in response to an environmental change accompanying the movement of a mobile obstacle. Further, the path plan may suffer a relatively large change every time the path plan is updated.

The present invention has been accomplished in view of the foregoing, with an object to provide a path plan generating apparatus that makes it possible to change a path plan quickly and dynamically in response to an environmental change in the operating environment of the mobile body and to generate a path plan having high stability.

The present invention provides an apparatus for generating a path plan for a mobile body, the apparatus including:

an obstacle information acquiring section which acquires obstacle information including at least information indicating an existence position of each obstacle present in an operating environment of the mobile body;

an initial path plan generating section which generates an initial path plan that is a path plan from an initial position, where the mobile body starts moving, to a goal point;

an RRT path plan generating section which is operable, in a case where future occurrence of interference between the mobile body on the initial path plan and any obstacle is predicted based on the initial path plan and the obstacle information, to generate a path plan from a current position of the mobile body to the goal point, by processing based on an rapidly-exploring random tree (RRT) algorithm, so as to be able to avoid future interference between the mobile body and each obstacle; and a path plan correcting section which sets, using the obstacle information, a potential field that generates a virtual repulsive force in a region surrounding each obstacle, and, in a case where a generated path plan includes a section that is predicted to be affected by the potential field of at least one obstacle, corrects the generated path plan, by processing based on a potential method, so as to reduce the repulsive force acting on the section from the potential field, the path plan correcting section sequentially performing the correction on at least an RRT path plan among the initial path plan and the RRT path plan, the RRT path plan being a path plan generated by the RRT path plan generating section (first aspect of the invention).

In the present invention, the term "path plan" means one that defines a relationship between a position (in a two-dimensional or three-dimensional space) and a time during movement of a mobile body.

For a given path plan, the term "mobile body on the path plan" means a mobile body that moves in accordance with the path plan.

According to the first aspect of the invention, in the case where future occurrence of interference between the mobile body on the initial path plan and an obstacle is predicted, an RRT path plan is generated by the processing based on the RRT algorithm.

Thus, the initial path plan generating section may generate an initial path plan with a simple technique, without taking much account of whether interference between the mobile body and an obstacle will occur in the future.

While the RRT path plan is generated so as to be able to avoid future interference between the mobile body on the RRT path plan and each obstacle, in a case where there occurs an environmental change such as a change in moving state of a mobile obstacle among the obstacles present in the operating environment after the generation of the RRT path plan, there is a possibility that the mobile body on the RRT path plan may interfere with an obstacle.

In the first aspect of the invention, however, when the RRT path plan is generated, thereafter, the path plan correcting section sequentially performs the processing of correcting the RRT path plan, by the processing based on the potential method.

Thus, after the generation of the RRT path plan, even if there is an environmental change such as a change in moving state of the mobile obstacle among the obstacles present in the operating environment, the RRT path plan is dynamically corrected such that the occurrence of interference between the mobile body and each obstacle may be avoided as much as possible.

In this case, the RRT path plan is corrected by the processing based on the potential method, so the correction can be made quickly. It is also possible to prevent the corrected path plan from becoming a path plan divergent from the original RRT path plan.

Further, in the case where future occurrence of interference between the mobile body on the initial path plan and an obstacle is not predicted, the initial path plan can be utilized as a path plan for movement of the mobile body.

Thus, according to the first aspect of the invention, it is possible to quickly and dynamically change a path plan in response to an environmental change in the operating environment of the mobile body, and to generate a path plan having high stability.

In the first aspect of the invention, it is preferable that the path plan correcting section is configured to sequentially perform the correction on the initial path plan by the processing based on the potential method, after the initial path plan is generated by the initial path plan generating section, until the RRT path plan is generated by the RRT path plan generating section (second aspect of the invention).

With this configuration, even in the case where the RRT path plan is not generated with no future interference predicted between the mobile body on the initial path plan and an obstacle, the initial path plan is dynamically corrected by the processing based on the potential method so as to prevent as much as possible the occurrence of interference between the mobile body and each obstacle.

Thus, even before the generation of the RRT path plan, it is possible to quickly and dynamically change a path plan in response to an environmental change in the operating environment of the mobile body, and to generate a path plan having high stability.

In the first or second aspect of the invention, it is preferable that the RRT path plan generating section is configured to further have a function of newly generating the RRT path plan in a case where it is predicted based on the path plan corrected by the path plan correcting section and the obstacle information that interference between the mobile body on the corrected path plan and an obstacle is unavoidable, and that the path plan correcting section is configured, in a case where the RRT path plan has been newly generated by the RRT path plan generating section, to sequentially perform the correction on the new RRT path plan by the processing based on the potential method (third aspect of the invention).

In some cases, with the correction processing (based on the potential method) performed on the generated path plan (the initial path plan or the RRT path plan) by the path plan correcting section, the corrected path plan may be restrained in the state where interference between the mobile body and an object is unavoidable (for example, the path plan is sandwiched between two obstacles) depending on the arrangement of the obstacles in the operating environment of the mobile body or depending on the distribution of the potential fields set in accordance with the moving states of the mobile obstacles.

In such a case, according to the third aspect of the invention, an RRT path plan is newly generated by the RRT path plan generating section. Thereafter, the new RRT path plan is corrected by the processing (based on the potential method) performed by the path plan correcting section.

It is thus possible to generate a path plan that allows the mobile body to keep moving, by preventing as much as possible an undesirable situation where it becomes impossible to generate an appropriate path plan enabling the mobile body to move without causing interference between the mobile body and an obstacle.

Further, according to the third aspect of the invention, the cases where the RRT path plan generating section generates an RRT path plan can be limited to the following cases: the case where future occurrence of interference between the mobile body on the initial path plan and an obstacle is predicted; and the case where it is predicted that interference between the mobile body on the path plan corrected by the path plan correcting section and an obstacle is unavoidable. It is thus possible to enhance the stability of the path plan by reducing, as much as possible, the possibility of a relatively large change in the path plan.

In the third aspect of the invention, it is preferable that the path plan correcting section is configured to sequentially perform the correction on the generated path plan by the processing based on the potential method at prescribed control processing cycles, and that the case where it is predicted that interference between the mobile body on the corrected path plan and an obstacle is unavoidable is a case where the corrected path plan with which future occurrence of interference between the mobile body and an obstacle is predicted has been generated repeatedly in a predetermined number of control processing cycles of the path plan correcting section (fourth aspect of the invention).

Here, for example even in the case where future occurrence of interference between the mobile body on the corrected path plan and a mobile obstacle is predicted at a certain time point in a control processing cycle, a later change in moving state of the mobile obstacle or the like may bring about a situation where future occurrence of such interference between the mobile body on the corrected path plan and the mobile obstacle is no longer predicted.

Thus, in the fourth aspect of the invention, the RRT path plan generating section generates a new RRT path plan after the corrected path plan with which future occurrence of interference between the mobile body and an obstacle is predicted has been generated repeatedly in a predetermined number of control processing cycles of the path plan correcting section.

This can prevent an RRT path plan from being generated frequently by the RRT path plan generating section. Consequently, it is possible to further enhance the stability of the path plan.

In the first through fourth aspects of the invention, the path plan correcting section may be configured to correct a path plan in the section of the generated path plan by displacing at least one node set in the section by a displacement amount determined in accordance with at least a repulsive force acting from the potential field of the obstacle (fifth aspect of the invention).

With this configuration, at least one node, set in the aforesaid section in the generated path plan, can be displaced elastically in a similar manner as the displacement of a spring.

In the fifth aspect of the invention, it is preferable that the path plan correcting section is configured, in a case where it is predicted, after the correction of the path plan in the section, that the potential field will cease to act on the section, to cause the section to gradually return to a state before being corrected (sixth aspect of the invention).

With this configuration, in the case where it is predicted that the potential field will cease to act on the section due to a change in moving state of the mobile obstacle or the like, the corrected path plan can be made to gradually approach the original path plan (initial path plan or RRT path plan). Consequently, it is possible to prevent the corrected path plan from being changed excessively from the original path plan (initial path plan or RRT path plan).

In the first through sixth aspects of the invention, it is preferable that the apparatus further includes an interference determining section which determines whether interference will occur between the mobile body on a target path plan and a mobile obstacle among the obstacles in accordance with whether there will be an overlap between an existence region of the mobile body on the target path plan and an existence region of each obstacle set based on the obstacle information, the target path plan being any one of the initial path plan, the RRT path plan, and the path plan corrected by the path plan correcting section, and that the interference determining section is configured to set a future existence region of the mobile obstacle for use in determining whether interference will occur between the mobile body and the mobile obstacle, in such a manner that a size of the existence region will be decreased to zero over time (seventh aspect of the invention).

Here, the mobile obstacle, particularly a person or other mobile obstacle, moves at a velocity that is apt to change. In the state where the mobile obstacle and the mobile body are relatively distant from each other, it is difficult to determine with high reliability whether interference will occur between the mobile body on the target path plan and the mobile obstacle.

Thus, in the seventh aspect of the invention, the interference determining section sets, as the future existence region of the mobile obstacle for use in determining whether interference will occur between the mobile body and the mobile obstacle, in such a manner that a size of the existence region will be decreased to zero over time.

With this configuration, in the state where the mobile obstacle and the mobile body are relatively distant from each other, even in the case where it is predicted that the mobile obstacle is approaching the mobile body, the size of the existence region of the mobile obstacle is decreased as the obstacle approaches the mobile body, and it finally becomes zero (the existence region disappears).

Accordingly, in the state where the mobile obstacle and the mobile body are relatively distant from each other, it is possible to prevent, as much as possible, the interference determining section from determining that interference between the mobile obstacle and the mobile body will occur in the future.

As a result, it is possible to prevent, as much as possible, the RRT path plan generating section from generating an RRT path plan that unnecessarily avoids interference between the mobile obstacle and the mobile body, or from newly generating an RRT path plan. Consequently, it is possible to further enhance the stability of the path plan generated.

In the seventh aspect of the invention, it is preferable that the path plan correcting section is configured to set a future region of a potential field of the mobile obstacle in such a manner that the region will be reduced in size along with the decrease of the size of the existence region of the mobile obstacle (eighth aspect of the invention).

With this configuration, in the state where the mobile obstacle and the mobile body are relatively distant from each other, even in the case where it is predicted that the mobile obstacle is approaching the mobile body, the region of the potential field of the mobile obstacle diminishes as the obstacle approaches the mobile body, and it finally disappears.

As a result, it is possible to prevent the path plan correcting section from unnecessarily correcting the path plan. Consequently, it is possible to enhance the stability of the path plan corrected by the path plan correcting section.

BRIEF DESCRIPTION OF THE DRAWINGS

FIG. 4 is a block diagram showing the functional configuration of a path plan generating apparatus in an embodiment;

FIGS. 8A and 8B show changes over time of an existence region of a mobile obstacle when the mobile obstacle has stopped from the moving state;

FIG. 21 shows, by way of example, a path plan corrected at time t4 after the time t3;

FIG. 22A shows a state where a path plan is sandwiched between a fixed or stationary obstacle and a mobile obstacle;

FIG. 22B shows a state where a path plan is sandwiched between two mobile obstacles.

DESCRIPTION OF THE PREFERRED EMBODIMENTS

Figure 1:
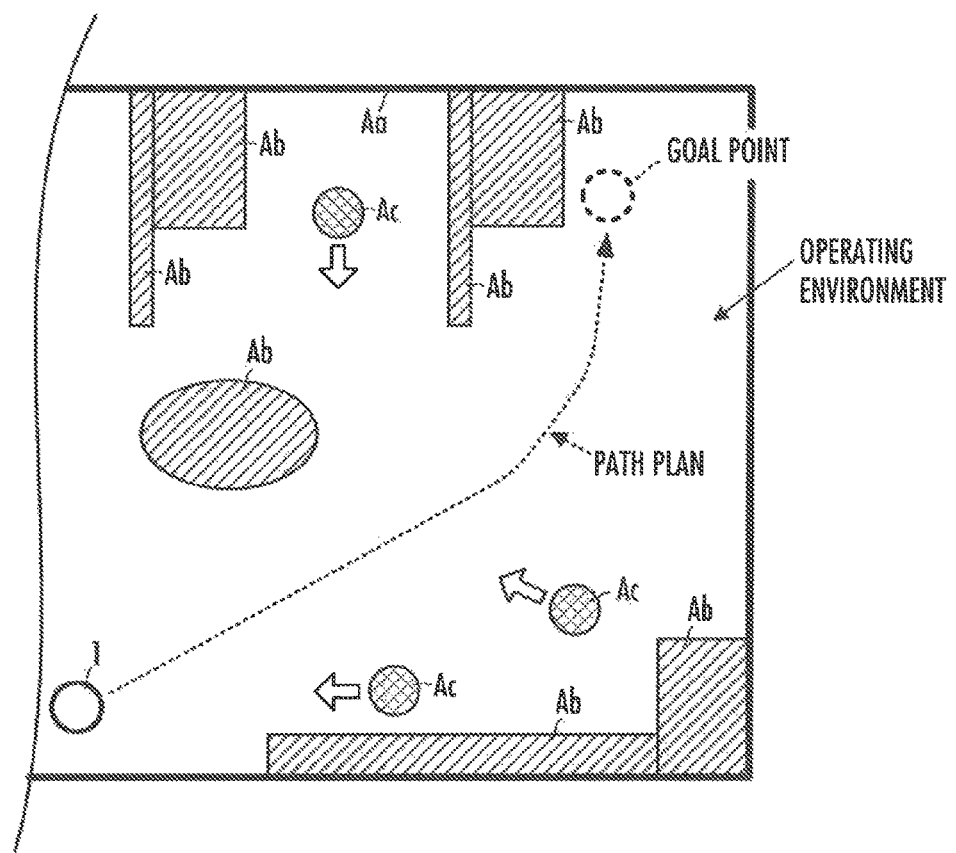
FIG. 1 illustrates an operating environment of a mobile body in an embodiment of the present invention.
Figure 2:
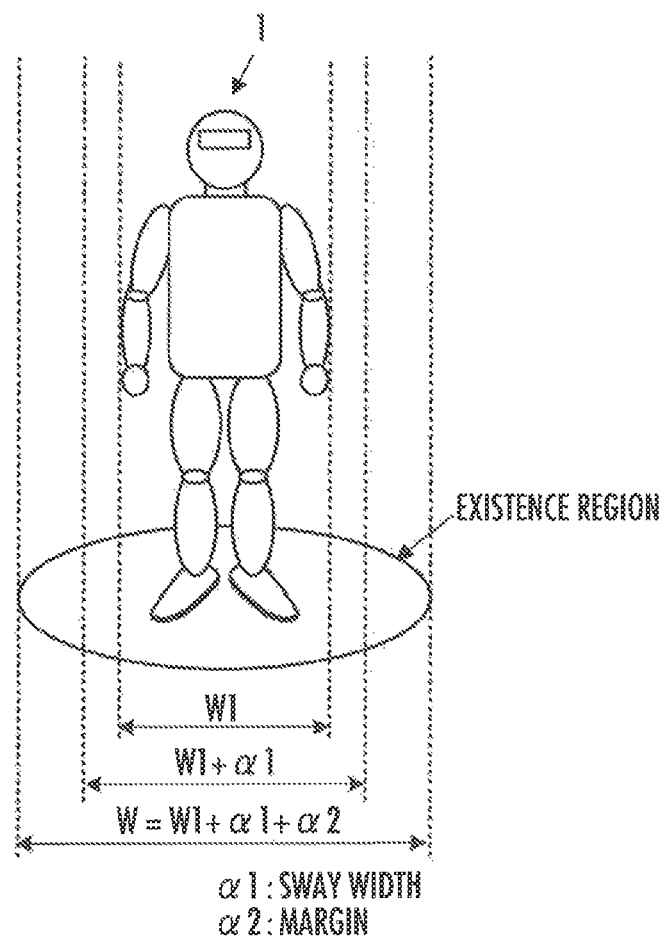
FIG. 2 shows a mobile body in an embodiment.

An embodiment of the present invention will be described below with reference to FIGS. 1 to 23. FIG. 1 schematically illustrates an operating environment in the present embodiment in which a mobile body 1 is moved. In an example of the present embodiment, the mobile body 1 is a humanoid legged mobile robot as shown in FIG. 2, for example. In the operating environment in which this mobile body 1 is moved, there are a plurality of obstacles Aa, Ab, and Ac, as schematically illustrated in FIG. 1.

The obstacles Aa, Ab, and Ac are objects the contact with which should be avoided by the mobile body 1 during the movement of the mobile body 1. The obstacles Aa, Ab, and Ac include, for example, fixed obstacles Aa such as a wall, column, etc. of a building, stationary obstacles Ab such as a table, partition, shelf, chair, potted plant, display board, etc. disposed in an operating environment, and mobile obstacles Ac such as a person, other mobile robot, etc. The stationary obstacle Ab is, more specifically, an obstacle that is normally stationary, although it is not permanently fixed like the fixed obstacle Aa.

In the following description, the obstacles Aa, Ab, and Ac will be collectively referred to as obstacles A when it is unnecessary to distinguish between them.

The present embodiment is an embodiment of an apparatus which generates a path plan for the mobile body 1 (legged mobile robot) that enables the mobile body 1 to move in the operating environment in which the above-described obstacles A exist, from a given start point (movement starting point) to a goal point without causing interference (contact) with any obstacle A.

Such a path plan is made up of information that defines the spatial arrangement (position and direction) of a moving path of the mobile body 1 (specifically, moving path of a representative point of the existence region of the mobile body 1) and the time corresponding to each position on the moving path, or of information that defines the position of the mobile body 1 (specifically, position of the representative point of the existence region of the mobile body 1) at each time during the moving period of the mobile body 1.

Figure 3:
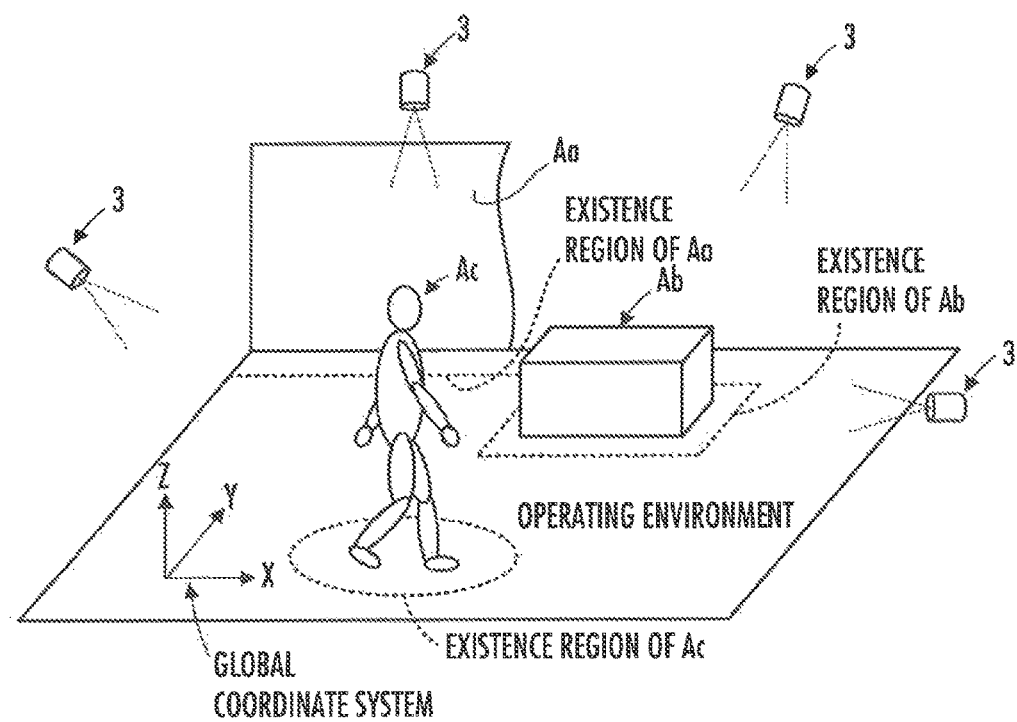
FIG. 3 shows, by way of example, obstacle detection sensors disposed in an operating environment.

In the operating environment, at least one obstacle detection sensor 3 is disposed, as illustrated in FIG. 3, for detecting obstacles A existing in the environment. For the obstacle detection sensor 3, a laser multi-point distance-measuring sensor such as a laser range finder, camera, radar, etc. may be used.

The mobile body 1 is equipped with a sensor (not shown) for recognizing the self-position in an operating environment, or for recognizing the environment surrounding the mobile body 1. For such a sensor, a laser multi-point distance-measuring sensor such as a laser range finder, camera, radar, etc. may be used. It should be noted that, as the sensor for recognizing the self-position of the mobile body 1, in addition to the above sensors, a sensor (acceleration sensor, gyro sensor, etc.) for recognizing the self-position on the basis of inertial navigation system, a joint displacement sensor that detects the amount of displacement of each joint of the mobile body 1, a GPS receiver, etc. may also be used.

FIG. 4 is a block diagram showing the basis configuration of a path plan generating apparatus 10 according to the present embodiment. This path plan generating apparatus 10 is made up of an electronic circuit unit including a CPU, RAM, ROM, interface circuit and the like, or a computer, or a combination thereof. The components of the path plan generating apparatus 10 may be mounted on the mobile body 1, or may be disposed outside the mobile body 1. The path plan generating apparatus 10 may include both of the component(s) mounted on the mobile body 1 and the component(s) disposed outside the mobile body 1.

The path plan generating apparatus 10 receives: detection data (sensing data) from the above-described obstacle detection sensor 3 and the sensor of the mobile body 1 (hereinafter, referred to as "mobile body-mounted sensor"); and a move request to the mobile body 1 (request concerning the timing to start movement of the mobile body 1, a goal point, a via point, a moving velocity, etc. during the movement) output from a controlling device of the mobile body 1, a scheduling server, or the like.

The path plan generating apparatus 10 includes, as functional sections implemented by installed programs or hardware configuration: a positional information acquiring section 11, which acquires positional information of the mobile body 1 and each obstacle A; a path plan generating processor 12 which performs processing of generating a path plan for the mobile body 1 using the positional information and others; and a move command section 13 which outputs a move command to the mobile body 1 on the basis of the path plan.

The processing performed by each functional section of the path plan generating apparatus 10 will be described in detail below. In the following description of the present embodiment, the case where the mobile body 1 moves on a flat floor surface will be described as a primary example for ease of understanding.

Processing in Positional Information Acquiring Section 11

The positional information acquiring section 11 sequentially acquires positional information of each obstacle A by using the detection data from the obstacle detection sensor 3, and also sequentially acquires positional information of the mobile body 1 by using the detection data from the mobile body-mounted sensor (not shown). It should be noted that the positional information acquiring section 11, having the function of acquiring the positional information of each obstacle A, has the function as the obstacle information acquiring section in the present invention. In this case, the positional information of each obstacle A corresponds to the obstacle information in the present invention.

Here, the positional information of respective ones of the obstacles A and the mobile body 1 are, more specifically, information representing the positions of existence regions of the respective ones of the obstacles A and the mobile body 1.

The existence region of the mobile body 1 is a region within which the entire mobile body 1 actually exists, or within which it may be considered highly likely that the mobile body 1 exists. The same applies to the existence region of each obstacle A. In this case, the existence regions of the mobile body 1 and the obstacles A are defined as regions that are larger than the actual existence regions specified by the detection data, taking account of irregularities of the outer geometries of the respective ones of the mobile body 1 and the obstacles A, or errors in the detection data.

For example, in the present embodiment, the existence region of the mobile body 1 is defined as a circular region, as illustrated in FIG. 2.

In the present embodiment, the mobile body 1 is a legged mobile robot. The body (upper body) of the mobile body 1 sways from side to side while the mobile body 1 is moving (or, walking). Thus, the existence region of the mobile body 1 is defined as a region, as illustrated in FIG. 2, which has a width W (diameter) obtained by adding a set value $\alpha 1$ of sway width of the upper body of the mobile body 1 and a margin $\alpha 2$ of a predetermined value to the actual width W1 of the mobile body 1.

In the case where an obstacle A is a person or legged mobile robot (with a similar configuration as the mobile body 1) (i.e. in the case where the obstacle A is a legged mobile obstacle Ac), the existence region of the obstacle Ac is defined as a region similar to the existence region of the mobile body 1, as illustrated in FIG. 3.

In the case where an obstacle A is a fixed obstacle Aa or a stationary obstacle Ab, the existence region of the obstacle Aa or Ab is defined, for example, as a region that protrudes by a predetermined margin from the actual surface position of the obstacle Aa or Ab, as illustrated in FIG. 3.

It should be noted that the existence region of the mobile body 1 shown in FIG. 2 or the existence region of each obstacle A shown in FIG. 3 is, more specifically, a two-dimensional region for use in generating a path plan for the mobile body 1 as seen projected on a horizontal surface (or floor surface).

In the case of generating a path plan for causing the mobile body 1 to move in three dimensions, a three-dimensional region may be used as the existence region of each of the mobile body 1 and the obstacles A. For example, as the existence region of the mobile body 1 or a mobile obstacle Ac, a columnar region, such as a cylindrical region, having a height slightly taller than the actual height of the mobile body 1 or the mobile obstacle Ac may be used. In this case, the area of the cross section of the existence region can be changed in the height direction.

Supplementally, for the existence region of each of the mobile body 1 and the obstacles A, various shapes may be adopted in accordance with the outer shape of each of the mobile body 1 and the obstacles A. For example, a two-dimensional region of an oval shape or a polygonal shape, or a three-dimensional region of a columnar shape having an oval or polygonal cross section, may be adopted.

Further, in the case where the mobile body 1 or a mobile obstacle Ac is one that makes no sway during the movement or its sway is sufficiently small (for example in the case of a wheel type mobile body or mobile obstacle), there is no need for the width of the existence region of the mobile body 1 or the mobile obstacle Ac to include an allowance for sway.

The positional information acquiring section 11 sequentially acquires, at prescribed control processing cycles, the positional information representing the position of the existence region defined for the mobile body 1 and for each obstacle A as described above, by using the detection data of the mobile body-mounted sensor and the obstacle detection sensor 3.

Here, the positional information of the existence region of each of the mobile body 1 and an obstacle A acquired by the positional information acquiring section 11 is information that represents the position of the existence region observed in a global coordinate system (for example, the XYZ orthogonal coordinate system shown in FIG. 3) designed and set as appropriate for the operating environment.

In this case, the positional information of the mobile body 1 and each obstacle A can be acquired for example in the following manner.

An estimate of the position of the mobile body 1 observed in a coordinate system for the mobile body 1 is obtained sequentially from the detection data of the mobile body-mounted sensor. The estimated position is then subjected to coordinate conversion, whereby an estimate of the position of the mobile body 1 observed in the global coordinate system is obtained sequentially. From this estimated position obtained by the coordinate conversion, on the basis of the definition of the existence region of the mobile body 1, positional information representing the position of the existence region of the mobile body 1 observed in the global coordinate system is acquired sequentially.

Further, from the detection data of the obstacle detection sensor 3, an estimate of the position of the surface portion of each obstacle A observed in a coordinate system for the obstacle detection sensor 3 (or, the sensor coordinate system) is obtained sequentially. The estimated position is subjected to coordinate conversion, whereby an estimate of the position of the surface portion of each obstacle A observed in the global coordinate system is obtained sequentially. From this estimated position obtained by the coordinate conversion, on the basis of the definition of the existence region of each obstacle A, positional information representing the position of the existence region of the obstacle A observed in the global coordinate system is acquired sequentially.

For an obstacle A, the positional information acquiring section 11 specifies whether the obstacle A is a mobile obstacle Ac or not, on the basis of the time series of the estimate of the position of the obstacle A, for example. For a mobile obstacle Ac, the positional information acquiring section 11 further performs processing of sequentially estimating a moving velocity (including the moving direction) of the mobile obstacle Ac on the basis of the time series of its estimated position (observed in the global coordinate system).

Supplementally, the detection data of the obstacle detection sensor 3 includes, not only the detection data about the obstacles A, but also the detection data about the mobile body 1. Thus, the positional information acquiring section 11 uses the information on the self-position of the mobile body 1 to perform processing of eliminating the detection data about the mobile body 1 from the detection data of the obstacle detection sensor 3.

It should be noted that the position of a fixed obstacle Aa is steadily constant. Thus, the positional information representing the position of the existence region of the fixed obstacle Aa may be stored in advance in a memory of the path plan generating apparatus 10. In this case, the detection data about the fixed obstacle Aa is unnecessary.

Further, the position of a stationary obstacle Ab is usually kept unchanged for a long period of time. Thus, the positional information of the stationary obstacle Ab may be acquired on the basis of the detection data, for example periodically at intervals which are sufficiently longer than those for a mobile obstacle Ac. Alternatively, it may be configured for example such that, when a stationary obstacle Ab is moved, an operator or the like causes the positional information of the stationary obstacle Ab to be stored in the memory of the path plan generating apparatus 10.

Processing in Path Plan Generating Processor 12

Next, the path plan generating processor 12, in response to a move request to the mobile body 1, performs processing of generating a path plan for the mobile body 1 sequentially at prescribed control processing cycles.

In the present embodiment, as shown in FIG. 4, the path plan generating processor 12 includes, as primary constituent processing sections, an initial path plan generating section 21 which performs processing of generating an initial path plan from an initial position (start point) to a goal point of the mobile body 1, an RRT path plan generating section 22 which performs processing of generating, by a rapidly-exploring random tree (RRT) algorithm, an RRT path plan from the current position to the goal point of the mobile body 1, a path plan correcting section 23 which performs processing of correcting the initial path plan or the RRT path plan as appropriate by the potential method, and an interference determining processor 24 which performs, as appropriate, processing (hereinafter, referred to as "interference determining processing") of determining whether interference (contact) between the mobile body 1 and an obstacle A will occur (or is highly likely to occur) on each path plan generated or corrected.

It should be noted that the initial path plan generating section 21, the RRT path plan generating section 22, the path plan correcting section 23, and the interference determining processor 24 correspond respectively to the initial path plan generating section, the RRT path plan generating section, the path plan correcting section, and the interference determining section in the present invention.

Processing performed by the respective constituent processing sections will be described below. In the following description, unless otherwise specified, the X axis and the Y axis mean the coordinate axes in the global coordinate system, and the XY plane formed by the X axis and the Y axis means a horizontal plane (or a flat floor surface in an operating environment).

Processing in Interference Determining Processor 24

First, the processing performed by the interference determining processor 24 will be described. The interference determining processor 24 basically performs, as appropriate, the processing of determining whether interference between the mobile body 1 and an obstacle A will occur in the future, in accordance with whether the existence region of the mobile body 1 at each time point after the current time on the path plan will have an overlap with the existence region of the obstacle A. In the present embodiment, however, the determining processing is performed in slightly different manners in the case where the obstacle A is a fixed obstacle Aa or a stationary obstacle Ab and in the case where the obstacle A is a mobile obstacle Ac.

Figure 5A:
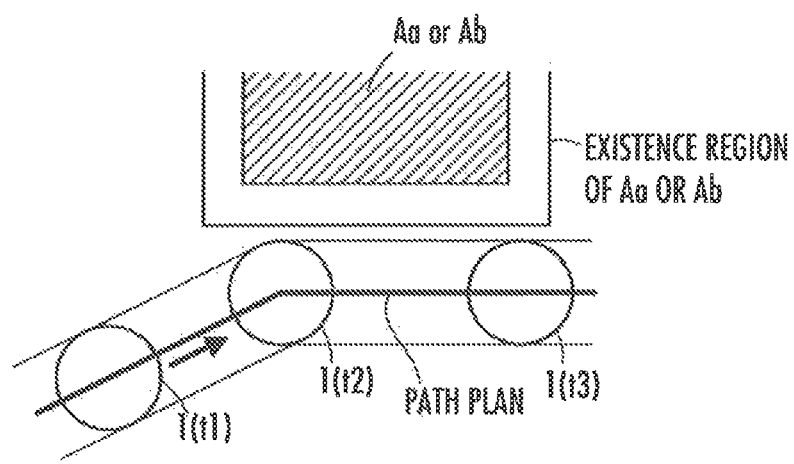
FIG. 5A illustrates a situation where it is determined that no interference will occur between a fixed or stationary obstacle and a mobile body.

In the case where the obstacle A is a fixed obstacle Aa or a stationary obstacle Ab, the interference determining processor 24 determines that there will be no interference between the mobile body 1 and the fixed obstacle Aa or the stationary obstacle Ab in the case where the existence region of the mobile body 1 at a given time on the path plan does not overlap with the existence region of the fixed obstacle Aa or the stationary obstacle Ab, as illustrated in FIG. 5A. It should be noted that FIG. 5A illustrates, as representative examples of the existence region (on the XY plane) of the mobile body 1, existence regions 1(t1), 1(t2), and 1(t3) of the mobile body 1 at three different times t1, t2, and t3.

Figure 5B:
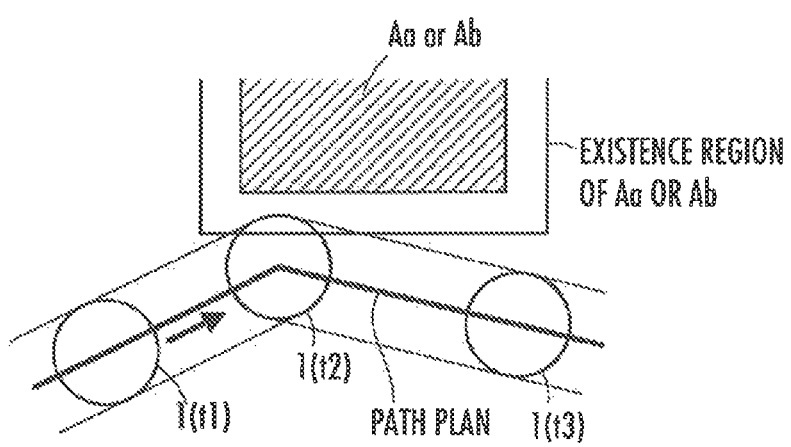
FIG. 5B illustrates a situation where it is determined that interference will occur between a fixed or stationary obstacle and a mobile body.

Further, the interference determining processor 24 determines that there will be interference between the mobile body 1 and a fixed obstacle Aa or a stationary obstacle Ab in the case where the existence region of the mobile body 1 at a certain time on the path plan overlaps with the existence region of the fixed obstacle Aa or the stationary obstacle Ab, as illustrated in FIG. 5B. It should be noted that FIG. 5B illustrates, as representative examples of the existence region (on the XY plane) of the mobile body 1, existence regions 1(t1), 1(t2), and 1(t3) of the mobile body 1 at three different times t1, t2, and t3. In the illustrated example, the existence region 1(t2) of the mobile body 1 at the time t2 overlaps with the existence region of the fixed obstacle Aa or the stationary obstacle Ab.

It should be noted that the existence region of a fixed obstacle Aa or a stationary obstacle Ab for use in determining the presence or absence of occurrence of interference between the mobile body 1 and the fixed obstacle Aa or the stationary obstacle Ab in the processing in the interference determining processor 24 is a latest existence region that the positional information acquiring section 11 has determined on the basis of the detection data of the obstacle detection sensor 3. Alternatively, the existence region of the fixed obstacle Aa or the stationary obstacle Ab may be the one stored and held in the memory in advance.

Figure 6:
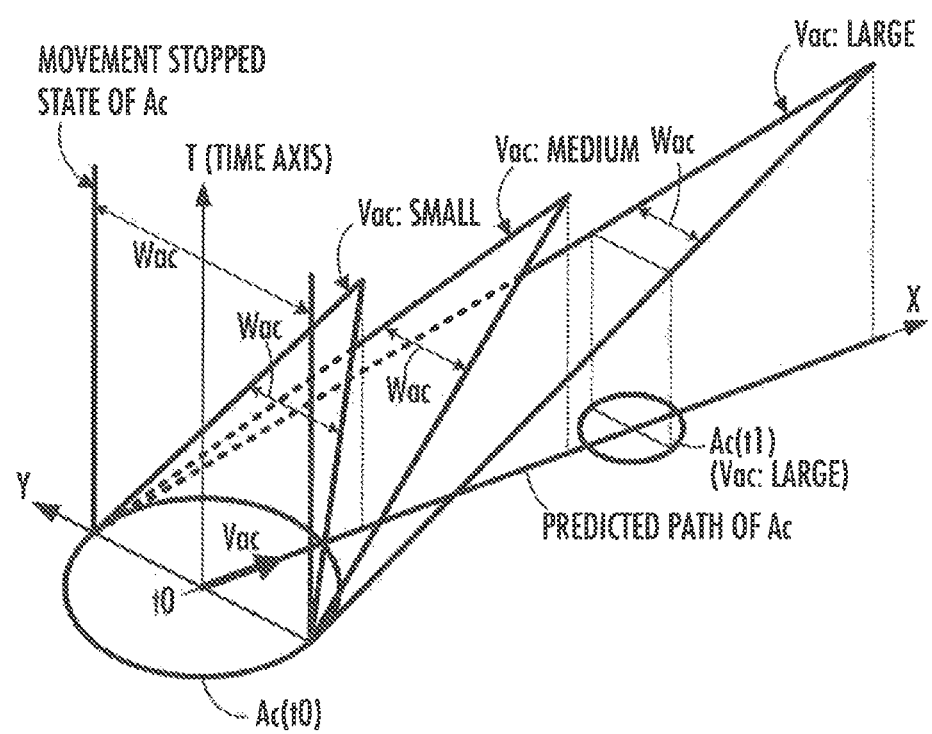
FIG. 6 shows changes over time of an existence region of a mobile obstacle.

On the other hand, in the case where the obstacle A is a mobile obstacle Ac, the interference determining processor 24 predicts a moving path of the mobile obstacle Ac after a current time t0, as shown in FIG. 6, assuming that the mobile obstacle Ac will move straight at a constant velocity that is the same as the estimate (calculated by the positional information acquiring section 11) of the moving velocity Vac of the mobile obstacle Ac at the current time t0.

The interference determining processor 24 then determines whether interference between the mobile body 1 and the mobile obstacle Ac will occur, in accordance with whether the existence region of the mobile obstacle Ac at each position (in the future) on the predicted path of the mobile obstacle Ac will have an overlap with the existence region of the mobile body 1 in the future on the path plan after the current time t0.

In this case, the interference determining processor 24 sets a future existence region of the mobile obstacle Ac in such a manner that the size, for example a width Wac, of the existence region of the mobile obstacle Ac in the future after the current time t0 will be decreased from the original width (the width of the existence region defined such that the mobile obstacle Ac would be included therein, as explained earlier) to zero over time, at a decrease rate (reduction amount per unit time or rate of diminution) according to the magnitude of the moving velocity Vac of the mobile obstacle Ac, as shown in FIG. 6.

Here, each triangle in FIG. 6 represents the manner in which the width Wac of the existence region (two-dimensional region on the XY plane in the illustrated example) of the mobile obstacle Ac is reduced at a constant decrease rate.

In this case, in the present embodiment, the interference determining processor 24 determines the decrease rate from an estimate of the moving velocity Vac, such that the decrease rate becomes smaller with larger moving velocity Vac, by using an arithmetic expression or a data table created in advance.

For example, referring to FIG. 6, the existence region Ac(t1) of the mobile obstacle Ac at time t1 in the future is set as an existence region, as illustrated, that is smaller in width than the existence region Ac(t0) of the mobile obstacle Ac at the current time t0 by an amount that is defined in accordance with the estimate of the moving velocity Vac (in the illustrated example, Vac: large) of the mobile obstacle Ac at the current time t0 as well as the elapsed time from the current time t0 (=t1−t0).

Supplementally, the size of the existence region of the mobile obstacle Ac after the current time t0 may be decreased in a manner other than the above-described manner. For example, a manner in which the area (on the XY plane) of the existence region of the mobile obstacle Ac is decreased at a decrease rate according to the moving velocity Vac, a manner in which the width Wac or area of the existence region of the mobile obstacle Ac is decreased at a predetermined decrease rate, irrespective of the moving velocity Vac, a manner in which the decrease rate of the width Wac or area of the existence region of the mobile obstacle Ac is changed over time, or other manner may be adopted as appropriate.

Further, in the case where a three-dimensional region is set as the existence region of the mobile obstacle Ac, a manner in which the width or area of the existence region projected on the XY plane and the height of that existence region are decreased, a manner in which the volume of the existence region is decreased, or other manner may be adopted.

Furthermore, a manner in which the decrease rate of the size of the existence region of a mobile obstacle Ac is changed depending on the type of the mobile obstacle Ac, or other manner may be adopted as well.

Here, a description will be made about the reason why the size of the existence region of the mobile obstacle Ac after the current time t0 is decreased over time in determining the presence or absence of future interference between the mobile body 1 and the mobile obstacle Ac.

In the state where the distance between the mobile obstacle Ac and the mobile body 1 is relatively large, it is often the case that the moving direction or moving velocity of the mobile obstacle Ac changes before the mobile obstacle Ac approaches the mobile body 1 sufficiently. Particularly in the case where the mobile obstacle Ac is a person or other legged mobile obstacle Ac, the lateral sway of the upper body of the obstacle often causes fluctuation in direction of the moving velocity of the mobile obstacle Ac that the positional information acquiring section 11 estimates on the basis of the detection data of the obstacle detection sensor 3.

Thus, a predicted path of the mobile obstacle Ac in the state where the distance between the mobile obstacle Ac and the mobile body 1 is relatively large generally becomes poor in reliability as the position on the predicted path approaches the mobile body 1.

Further, as the moving velocity of the mobile obstacle Ac is slower, the time required for the mobile obstacle Ac to sufficiently approach the mobile body 1 becomes longer. The moving direction of the mobile obstacle Ac may also change relatively noticeably before the mobile obstacle Ac sufficiently approaches the mobile body 1.

Thus, in the state where the distance between the mobile obstacle Ac and the mobile body 1 is relatively large, the predicted path of the mobile obstacle Ac on the side close to the mobile body 1 generally becomes poorer in reliability with slower moving velocity (its estimate at the current time) of the mobile obstacle Ac.

Accordingly, in the state where the distance between the mobile obstacle Ac and the mobile body 1 is relatively large, in case of determining the presence or absence of future interference between the mobile body 1 and the mobile obstacle Ac on the predicted path after the current time by assuming that the existence region of the mobile obstacle Ac is kept at a constant size encompassing the actual mobile obstacle Ac, it is generally difficult to make the determination with high reliability particularly on the side close to the mobile body 1.

When a determination result about the presence or absence of future interference between the mobile obstacle Ac and the mobile body 1 is poor in reliability, using the determination result to generate or correct a path plan for the mobile body 1 will cause an inconvenience that the path plan may be changed in an unnecessarily large scale, or that the mobile body 1 may be stopped at an unnecessarily early timing because a path plan that may avoid the interference cannot be generated.

In many cases, the path plan can be generated or corrected to avoid future interference between the mobile obstacle Ac and the mobile body 1, even at a time point when the mobile obstacle Ac and the mobile body 1 have come close to each other to some extent.

Thus, in the present embodiment, in the interference determining processing of determining interference between the mobile body 1 and the mobile obstacle Ac, the interference determining processor 24 sets the existence region of the mobile obstacle Ac in each position on the predicted path in such a manner that the size (width Wac) of the existence region of the mobile obstacle Ac after the current time will be decreased to zero over time at a decrease rate according to the estimate of the moving velocity Vac of the mobile obstacle Ac, as explained above.

The interference determining processor 24 then determines the presence or absence of interference between the mobile obstacle Ac and the mobile body 1 in accordance with whether there is an overlap between the existence region of the mobile obstacle Ac thus set and the existence region of the mobile body 1.

With this configuration, in the state where the distance between the mobile obstacle Ac and the mobile body 1 is relatively large, the situation where it is determined that there will be interference between the mobile obstacle Ac and the mobile body 1 becomes unlikely to occur.

As a result, in the state where the distance between the mobile obstacle Ac and the mobile body 1 is relatively large, it is possible to prevent, as much as possible, the interference determining processor 24 from determining that there will be future interference between the mobile obstacle Ac and the mobile body 1 on the basis of a predicted path of the mobile obstacle Ac that is poor in reliability.

Figure 7A:
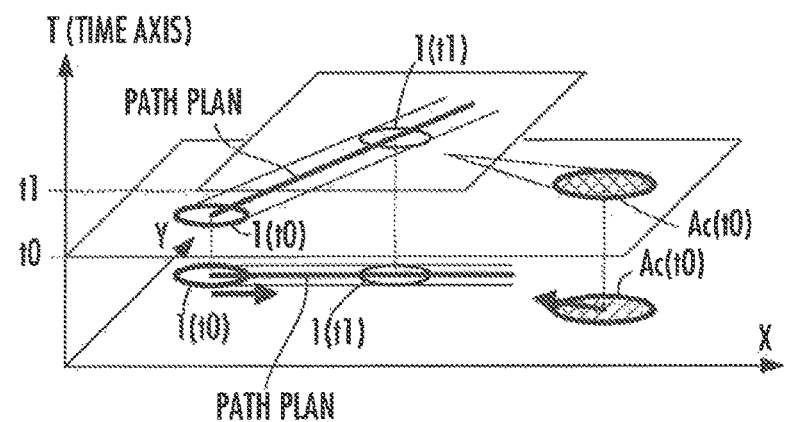
FIG. 7A illustrates a situation where it is determined that no interference will occur between a mobile obstacle and a mobile body.

For example, in a situation illustrated in FIG. 7A, although a mobile obstacle Ac is moving toward the mobile body 1 on the path plan at current time t0, the existence region 1(t0) of the mobile body 1 and the existence region Ac(t0) of the mobile obstacle Ac at the current time t0 are relatively widely distant from each other.

In this situation, the width or area of the existence region of the mobile obstacle Ac is decreased to zero before time t1 at which the mobile obstacle Ac reaches the position of the mobile body 1 on the path plan. This means that there will be no overlap between the existence region of the mobile body 1 on the path plan and the existence region of the mobile obstacle Ac. Thus, the interference determining processor 24 determines at the time point of current time t0 that there will be no interference between the mobile body 1 and the mobile obstacle Ac.

In FIG. 7A, the lower portion showing the existence regions of the mobile body 1 and the mobile obstacle Ac illustrate the movement in position of the existence regions of the mobile body 1 and the mobile obstacle Ac on the XY plane (or on the floor surface in the operating environment). The upper portion in the figure illustrates the movement in position of the existence regions of the mobile body 1 and the mobile obstacle Ac including the displacement in the time axis direction. The same applies to the other figures similar to FIG. 7A, including FIG. 7B described below.

On the other hand, in the state where the distance between the mobile obstacle Ac and the mobile body 1 is relatively small, the existence region of the mobile obstacle Ac on the predicted path in the situation where the mobile obstacle Ac is moving toward the mobile body 1 does not become so small as it approaches the existence region of the mobile body 1. In this case, the mobile obstacle Ac is located relatively close to the mobile body 1, so the predicted path of the mobile obstacle Ac is relatively high in reliability.

Thus, in the situation where it is highly likely that the interference between the mobile obstacle Ac and the mobile body 1 will actually occur, the interference determining processor 24 can appropriately determine that there will be future interference between the mobile obstacle Ac and the mobile body 1.

Figure 7B:
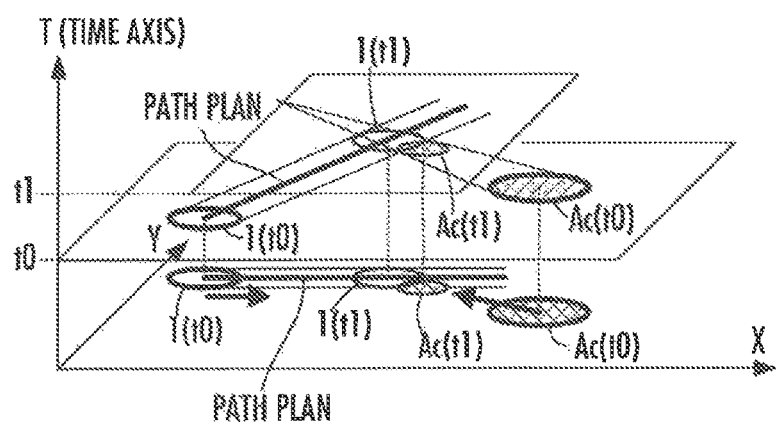
FIG. 7B illustrates a situation where it is determined that interference will occur between a mobile obstacle and a mobile body.

For example, FIG. 7B illustrates a situation at current time t0 where a mobile obstacle Ac is moving toward the mobile body 1 on the path plan in the state where the mobile obstacle Ac is located relatively close to the mobile body 1. In this situation, at time t1 around which the mobile obstacle Ac is expected to reach the position of the mobile body 1 on the path plan, the width (or area) of the existence region Ac(t1) of the mobile obstacle Ac has not been decreased noticeably as compared to the width (or area) of the existence region Ac(t0) at the current time t0.

With this, at the time t1, the existence region 1(t1) of the mobile body 1 and the existence region Ac(t1) of the mobile obstacle Ac overlap with each other. Thus, the interference determining processor 24 determines at the time point of current time t0 that there will be interference between the mobile body 1 and the mobile obstacle Ac at the future time t1.

In the present embodiment, in the case where it is estimated that the mobile obstacle Ac is stopped (in the case where the estimate of the moving velocity Vac is not greater than a predetermined value Vac_min (including the case of zero)), the interference determining processor 24, as illustrated in FIG. 6, determines the presence or absence of occurrence of interference between the mobile obstacle Ac and the mobile body 1 while keeping the size (in the illustrated example, the width Wac or area) of the existence region of the mobile obstacle Ac unchanged.

However, in the case where the estimate of the moving velocity Vac of the mobile obstacle Ac changes from a velocity greater than the predetermined value Vac_min to a velocity smaller than the predetermined value Vac_min (in the case where it is expected that the mobile obstacle Ac has changed from the moving state to the stopped state), in the control processing cycle immediately after that change, the interference determining processor 24 determines the presence or absence of occurrence of interference between the mobile obstacle Ac and the mobile body 1 by assuming, as shown in FIG. 8A, that the size (width Wac or area) of the existence region of the mobile obstacle Ac is kept at the inherent size corresponding to the actual size of the mobile obstacle Ac in a future period from the current time t0 (the start time of the stopped state) until a lapse of a predetermined time dt0 (or, in the future period from the time t0 to the time t0+dt0), and that the size (width Wac or area) of the existence region of the mobile obstacle Ac becomes zero in a future period after the lapse of the predetermined time dt0 (or, in the period after the time t0+dt0).

In this case, immediately before the stopping of the mobile obstacle Ac, the size of the existence region of the mobile obstacle Ac is set such that it will be decreased to zero over time, as explained earlier. Thus, in the present embodiment, at the start time t0 of the stopped state of the mobile obstacle Ac, the interference determining processor 24 sets the predetermined time dt0, which is the time width during which the size of the existence region of the mobile obstacle Ac is kept unchanged, to be the same time width as the time dt0 that would be required for the size of the existence region of the mobile obstacle Ac to be decreased to zero at the decrease rate according to the moving velocity of the mobile obstacle Ac immediately before the stopping thereof, as shown in FIG. 8A.

Thereafter (in the control processing cycles after the time t0), the interference determining processor 24 gradually extends the time width during which the size of the existence region of the mobile obstacle Ac is kept unchanged. For example, as illustrated in FIG. 8B, in the control processing cycle at time t1 after the start time t0 of the stopped state of the mobile obstacle Ac, the time width dt1 during which the size of the existence region of the mobile obstacle Ac is kept unchanged is set to be a time width that is longer than the time width dt0 at the start time t0 of the stopped state of the mobile obstacle Ac.

The above has described in detail the processing performed by the interference determining processor 24.

Processing in Initial Path Plan Generating Section 21

Processing performed by the initial path plan generating section 21 will now be described. The initial path plan generated by the initial path plan generating section 21 is a basic path plan which is generated by a simple technique at or before a timing at which a movement of the mobile body 1 according to a move request is newly started.

This initial path plan may be provisional. The initial path plan may be a path plan with which interference between the mobile body 1 and an obstacle A may occur, or it may be a path plan with which the certainty of avoiding interference between the mobile body 1 and an obstacle A is low.

As an example, the initial path plan generating section 21 may generate, as an initial path plan, a path plan that causes the mobile body 1 to move straight from its start point (movement starting point) to a goal point at a moving velocity designated by a move request (or at a certain moving velocity determined in advance).

Alternatively, the initial path plan generating section 21 may generate, as an initial path plan, a path plan that causes the mobile body 1 to move in a straight line or in a polygonal line from its start point to a goal point at a moving velocity designated by a move request (or at a certain moving velocity determined in advance) so as to be able to avoid only the interference of the mobile body 1 with a fixed obstacle Aa (or with a fixed obstacle Aa and a stationary obstacle Ab) among the obstacles A present in the operating environment.

It should be noted that the initial path plan may be generated in a manner other than the above-described manner. For example, a mobile obstacle Ac may be simply regarded as a stationary obstacle Ab, and an initial path plan may be generated, with the RRT algorithm or other technique, so as to be able to avoid interference of the mobile body 1 with every obstacle A.

Processing in RRT Path Plan Generating Section 22

Processing performed by the RRT path plan generating section 22 will now be described. The RRT path plan generated by the RRT path plan generating section 22 is a path plan which is generated by way of searching, according to the RRT algorithm, so as to be able to avoid interference between the mobile body 1 and each obstacle A.

In the present embodiment, the RRT path plan generating section 22 uses the RRT algorithm to provisionally generate a plurality of RRT path plans from the current position to a goal point of the mobile body 1. The RRT path plan generating section 22 then selects one of the generated RRT path plans that is suitable for avoiding the interference between the mobile body 1 and the obstacles A with highest possible reliability, and outputs the selected RRT path plan.

Figure 9:
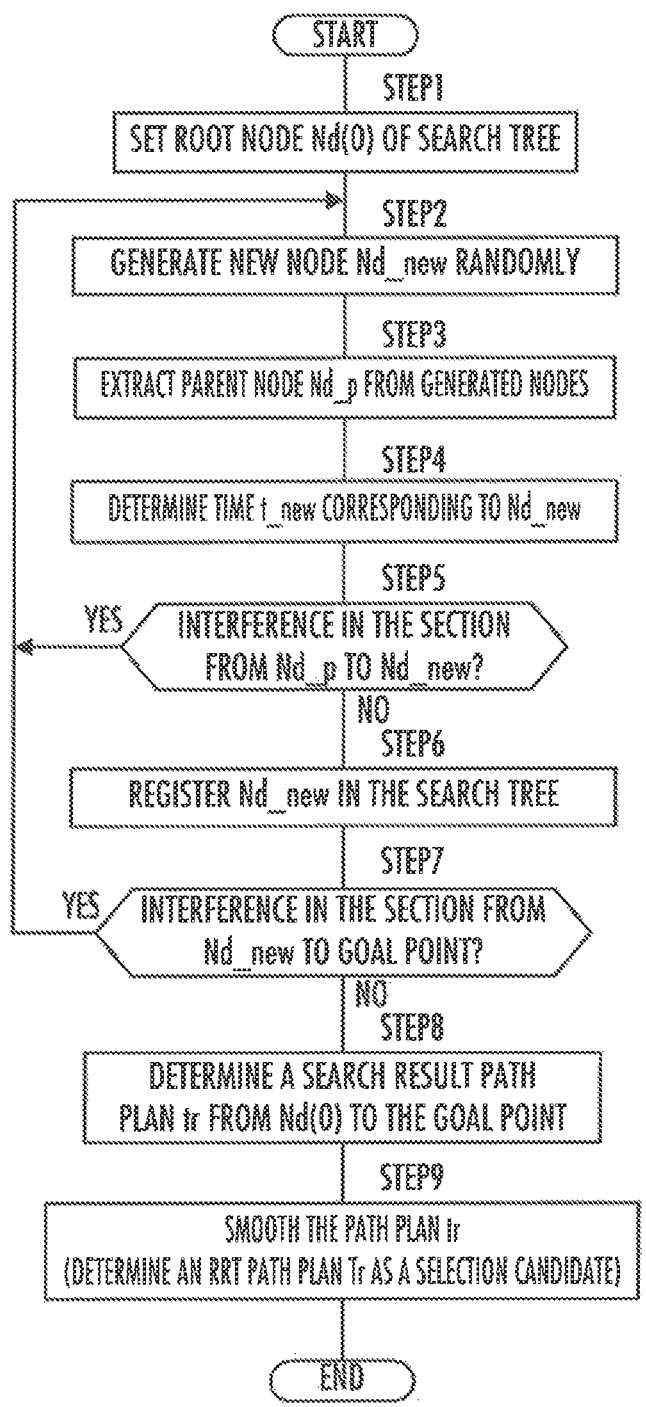
FIG. 9 is a flowchart illustrating processing performed by the RRT path plan generating section shown in FIG. 4.

In this case, each of the provisional RRT path plans, from which one RRT path plan will be selected ultimately, is generated on the basis of the RRT algorithm, by processing illustrated in the flowchart in FIG. 9, for example.

In STEP 1, the RRT path plan generating section 22 sets a position of a root node Nd(0) of a search tree based on the RRT algorithm. For example, the current position of the mobile body 1 (current position of the center of the existence region of the mobile body 1) acquired by the positional information acquiring section 11 is set as the position of the root node Nd(0). Alternatively, the position of the root node Nd(0) may be set at a position shifted toward the future side from the current position of the mobile body 1. For example, a position on the current path plan being used for movement of the mobile body 1, that is shifted frontward in the traveling direction from the current position of the mobile body 1, and that ensures no interference will occur between the mobile body 1 and an obstacle A in a path section from the current position to that position, may be set as the position of the root node Nd(0) of the search tree.

Next, in STEP 2, the RRT path plan generating section 22 randomly generates a new node Nd_new.

Then, in STEP 3, the RBI path plan generating section 22 extracts, from all the nodes generated in the search tree, a parent node Nd_p for the new node Nd_new. The parent node Nd_p is a node having the smallest distance from the new node Nd_new among all the nodes generated in the search tree.

Figure 10A:
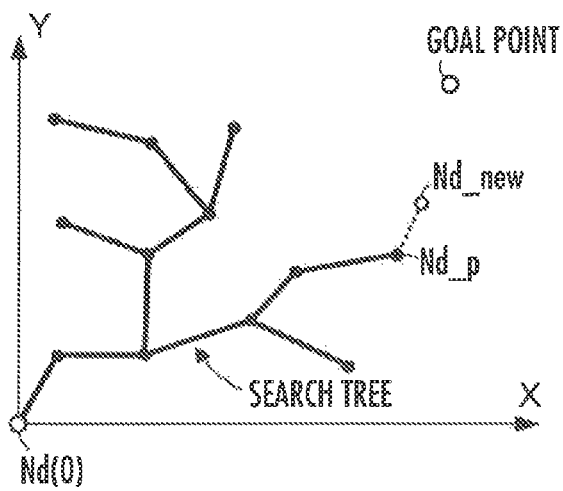
FIGS. 10A, 10B, and 10C illustrate the processing performed by the RRT path plan generating section shown in FIG. 4.

For example, in the state where the search tree has been generated as shown in FIG. 10A, when a new node Nd_new is generated, the node Nd_p in the figure is extracted as the parent node.

It should be noted that the parent node Nd_p for the new node Nd_new that is generated first in STEP 2 is the aforesaid root node Nd(0).

Figure 10B:
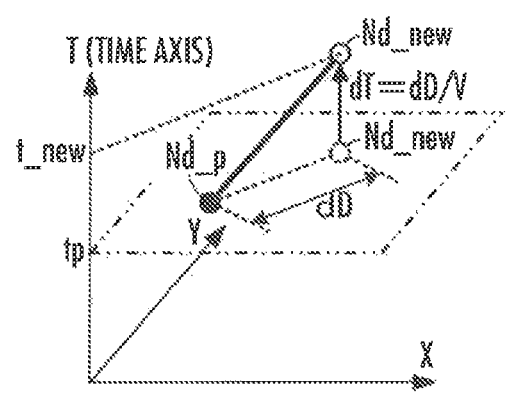

Next, in STEP 4, the RRT path plan generating section 22 determines a time t_new corresponding to the new node Nd_new. This time t_new is obtained, as shown in FIG. 10B, by adding a time dT which is obtained by dividing a distance dD between the new node Nd_new and the parent node Nd_p by a command value (a command value based on the move request or a prescribed value set in advance) of the moving velocity V of the mobile body 1 (that is, the time dT required to move from the parent node Nd_p to the new node Nd_new), to the time t_p of the parent node Nd_p.

Next, in STEP 5, the RRT path plan generating section 22 causes the interference determining processor 24 to perform processing of determining whether interference between the mobile body 1 and an obstacle A will occur in the section from the parent node Nd_p to the new node Nd_new provided that the mobile body 1 is moved along a straight path from the position of the parent node Nd_p to the position of the new node Nd_new.

If the determination result in the step STEP 5 is positive, the RRT path plan generating section 22 performs the processing from the above-described STEP 2 afresh. In this case, the previously generated new node Nd_new is erased.

If the determination result in the STEP 5 is negative, in STEP 6, the RRT path plan generating section 22 registers the new node Nd_new as a node constituting the search tree.

Further, in STEP 7, the RRT path plan generating section 22 causes the interference determining processor 24 to perform processing of determining whether interference will occur between the mobile body 1 and an obstacle A provided that the mobile body 1 is moved along a straight path from the new node Nd_new to the goal point.

If the determination result in this STEP 7 is positive, the RRT path plan generating section 22 repeats the processing from the STEP 2.

Figure 10C:
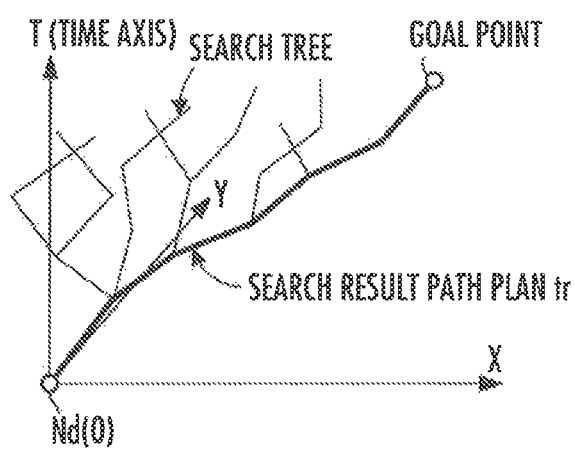

In this manner, the search tree (including lime information) is created as shown in FIG. 10C. If the determination result in the STEP 7 is negative, in STEP 8, the RRT path plan generating section 22 determines the path plan that continuously connects from the current position (in the illustrated example, the position of the root node Nd(0)) to the goal point of the mobile body 1, as shown in FIG. 10C, as a search result path plan tr generated by the search processing from STEP 1 through STEP 7. The search result path plan tr is a path plan formed with the branches of the search tree connected to one another from the current position to the goal point, and includes the lastly generated new node Nd_new and the root node Nd(0).

In this manner, one path plan tr that allows the mobile body 1 to move from the current position of the mobile body 1 to the goal point without causing interference with an obstacle A is obtained on the basis of the RRT algorithm. It should be noted that in the case where the position of the root node Nd(0) of the search tree is different from the current position of the mobile body 1, the current path plan from the current position to the position of the root node Nd(0) is adopted as a part of the path plan tr.

Next, in STEP 9, the RRT path plan generating section 22 performs smoothing of the path plan tr determined in the STEP 8. In this manner, one RRT path plan Tr based on the RRT algorithm (one candidate for the RRT path plan to be selected ultimately) is generated.

Figure 11:
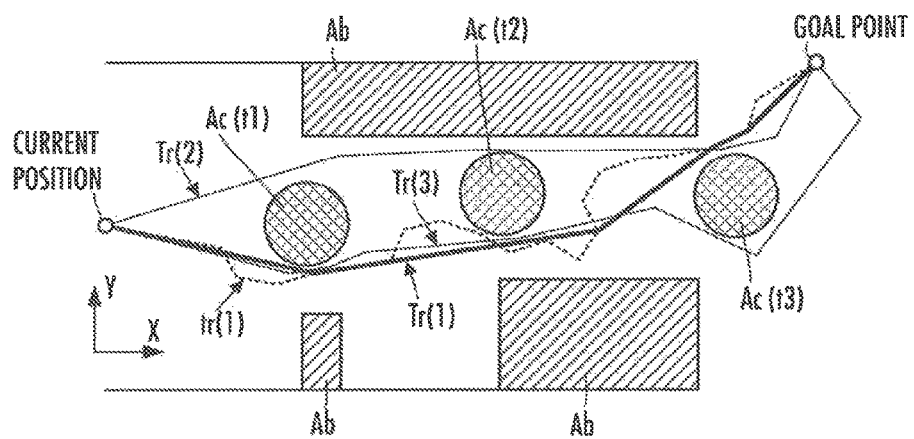
FIG. 11 illustrates an RRT path plan which is generated by the processing in the RRT path plan generating section shown in FIG. 4.

Here, FIG. 11 illustrates a path plan tr(1) as an example of the path plan tr determined in the STEP 8 and an RRT path plan Tr(1) obtained by smoothing the path plan tr(1) in the STEP 9. In the figure, a hatched region denoted by the reference characters Ab indicates the existence region of a stationary obstacle Ab, and a cross-hatched region denoted by the reference characters Ac(tx) (where x=1, 2, or 3) indicates the existence region of a mobile obstacle Ac at time tx.

Referring to FIG. 11, in the smoothing in the STEP 9, some nodes among all the nodes (broken points) on the path plan tr(1) are extracted, and a path plan connecting from the current position to the goal point, with the extracted nodes being via points, is determined as the smoothed RRT path plan Tr(1).

Specifically, nodes of the RRT path plan Tr(1) are extracted from the original path plan tr(1) in order from the current position side of the mobile body 1, such that the moving distance of the mobile body 1 from the current position to the goal point becomes minimum while satisfying the condition that no interference will occur between the mobile body 1 and an obstacle A on a line segment (straight path) connecting the neighboring nodes on the RRT path plan Tr(1). The extracted nodes are then connected in order from the current position side, whereby the smoothed RRT path plan Tr(1) is determined.

In the present embodiment, the RRT path plan generating section 22 repeats the above-described processing of generating a smoothed RRT path plan Tr a predetermined number of times, to generate a plurality of (the predetermined number of) RRT path plans Tr as the candidates for the RRT path plan to be selected ultimately. For example, as illustrated in FIG. 11, a plurality of (in the illustrated example, three) RRT path plans Tr(1), Tr(2), and Tr(3) are generated.

The RRT path plan generating section 22 then uses a potential field virtually set around each obstacle A to select one of the plurality of RRT path plans that is suitable for avoiding the interference between the mobile body 1 and the obstacles A, and outputs the selected RRT path plan (ultimately determines one RRT path plan).

Figure 12:
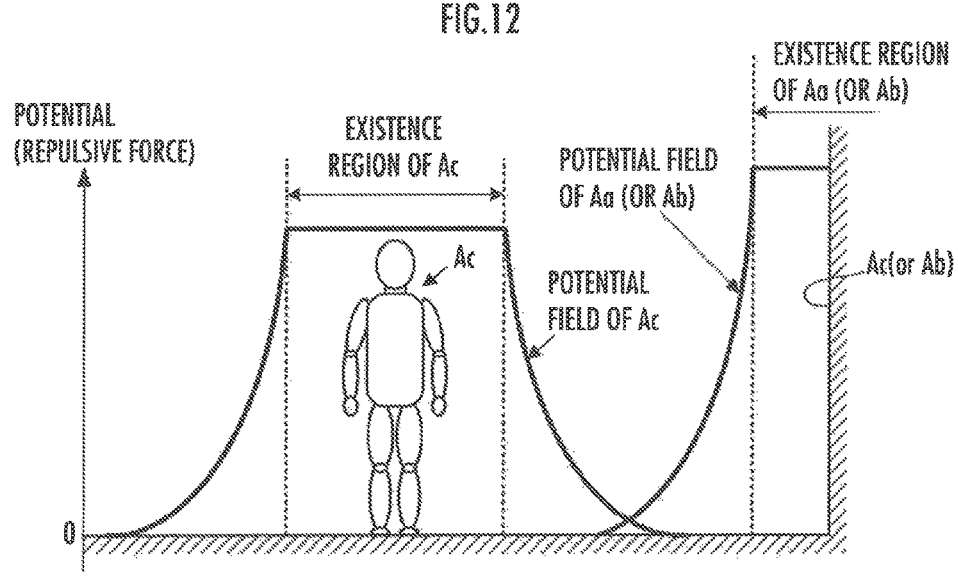
FIG. 12 illustrates potential fields of obstacles.

Here, the potential field corresponding to each obstacle A is a field indicating the spatial distribution of the potential value representing the degree of closeness with respect to the obstacle A. The potential field is defined such that the potential value becomes larger with decreasing distance from the obstacle A. Such a potential field is defined, for example, as shown in FIG. 12.

That is, the potential field corresponding to each obstacle A is set such that the potential value becomes largest in the existence region of the obstacle A and such that the potential value is decreased from the largest value to zero as the distance from the existence region of the obstacle A increases within the range of a predetermined distance from the boundary of the existence region of the obstacle A. In the region outside the range of the predetermined distance from the boundary of the existence region of the obstacle A, the potential value corresponding to the obstacle A is set to zero, or in other words, it is regarded that there is no potential field of the obstacle A.

In this case, the potential field corresponding to a fixed obstacle Aa or a stationary obstacle Ab is set as the field of a fixed position and fixed region. On the other hand, the potential field corresponding to a mobile obstacle Ac is set as the field that moves on the aforesaid predicted path of the mobile obstacle Ac together with the existence region of the mobile obstacle Ac.

In this case, the RRT path plan generating section 22 determines the size of the existence region of the mobile obstacle Ac such that it is decreased over time at a decrease rate according to an estimate of the moving velocity of the mobile obstacle Ac at the current time, similarly as in the processing in the aforesaid interference determining processor 24. Thus, the RRT path plan generating section 22 sets the region of the potential field of the mobile obstacle Ac such that it is reduced in size over time. After the size of the existence region of the mobile obstacle Ac has been decreased to zero, it is considered that there is no potential field of the mobile obstacle Ac.

Further, in the present embodiment, the RRT path plan generating section 22 sets the maximum value of the potential value of the potential field of the mobile obstacle Ac to a value smaller than the maximum value of the potential value of the potential field of each of a fixed obstacle Aa and a stationary obstacle Ab, for the purposes of preventing as much as possible the mobile body 1 from approaching too close to the fixed obstacle Aa or the stationary obstacle Ab.

In the example shown in FIG. 12, outside the existence region of each obstacle A, the potential value is set to be decreased in the form of quadratic function (parabola), for example, in accordance with the distance from the boundary of the existence region. Alternatively, it may be decreased in a different manner (for example, it may be decreased linearly or exponentially).

Further, while FIG. 12 shows the potential field for the existence region of each obstacle A when the existence region is a two-dimensional region, in the case where the existence region of each obstacle A is set as a three-dimensional region as well, the potential field of each obstacle A may be defined in a similar manner as described above.

The RRT path plan generating section 22 uses the potential field of each obstacle A defined as described above, to calculate, for each RRT path plan Tr, a potential evaluation value on the RRT path plan Tr. The RRT path plan generating section 22 mutually compares the potential evaluation values of the respective RRT path plans Tr, to select a suitable RRT path plan Tr.

Specifically, as the potential evaluation value, for example, one of the following may be adopted: a total sum of potential values over the entire path of an RRT path plan Tr (value obtained by integrating the potential value in each position on the RRT path plan Tr for the entire path); a potential value in a position on an RRT path plan Tr that is closest to an obstacle A; a total sum of potential values in a section of an RRT path plan Tr in which the distance from the existence region of an obstacle A becomes not larger than a predetermined distance (value obtained by integrating the potential value in each position in that section for the entire section); or a value obtained by linearly combining two or more of the above potential evaluation values.

It should be noted that a potential value in a position on each RRT path plan Tr that belongs to the potential fields of two or more obstacles A is calculated, for example, as a value obtained by summing up the potential values based on the potential fields of the respective obstacles A.

The RRT path plan generating section 22 selects one of the RRT path plans Tr that has the smallest potential evaluation value, as a suitable RRT path plan.

For example, in the situation shown in FIG. 11, from the three RRT path plans Tr(1), Tr(2), and Tr(3), Tr(1) is selected as the suitable RRT path plan.

The above has described in detail the processing performed by the RRT path plan generating section 22.

Processing in Path Plan Correcting Section 23

Next, processing performed by the path plan correcting section 23 will be described. The path plan correcting section 23 uses the potential method to correct a path plan (the initial path plan or the RRT path plan) that is being actually used for movement of the mobile body 1 (hereinafter, which may be referred to as "correction target path plan").

Here, the moving velocity or moving direction of a mobile obstacle Ac may change after generation of the correction target path plan. This may newly cause future interference between the mobile obstacle Ac and the mobile body 1 that moves in accordance with the correction target path plan. In such a case, the path plan correcting section 23 corrects part of the correction target path plan, by using the potential method.

Specifically, the path plan correcting section 23 uses the potential field of each obstacle A, described above in conjunction with the processing in the RRT path plan generating section 22, as a field in which a repulsive force is caused to act on the mobile body 1 present therein in a direction forcing it away from the obstacle A (in a direction in which the potential value decreases). In this case, the potential field having a higher potential value generates a larger repulsive force.

Thus, the repulsive force that is generated by the potential field defined as described above corresponding to each obstacle A (see FIG. 12) becomes largest in the existence region of the obstacle A, and the repulsive force is decreased from the largest value to zero as the distance from the existence region increases within the range of a predetermined distance from the boundary of the existence region.

It should be noted that, once the size of the existence region of a mobile obstacle Ac has been decreased to zero over time on the predicted path, the potential field of the mobile obstacle Ac disappears (the potential value around the mobile obstacle Ac is maintained at zero constantly), as explained earlier. Thus, after the size of the existence region of the mobile obstacle Ac has been decreased to zero, the potential field of the mobile obstacle Ac will generate no repulsive force.

The path plan correcting section 23 corrects part of the correction target path plan, such that a node (broken point) in a certain section in the correction target path plan is displaced elastically by the repulsive force based on the potential field.

Further, in the case where the repulsive force based on the potential field ceases to act due to a change in moving velocity or moving direction of the mobile obstacle Ac or the like, the path plan correcting section 23 causes the corrected section of the correction target path plan to gradually return to the original state, by an internal force that is virtually generated between the neighboring nodes in the corrected section of the correction target path plan.

Figure 13:
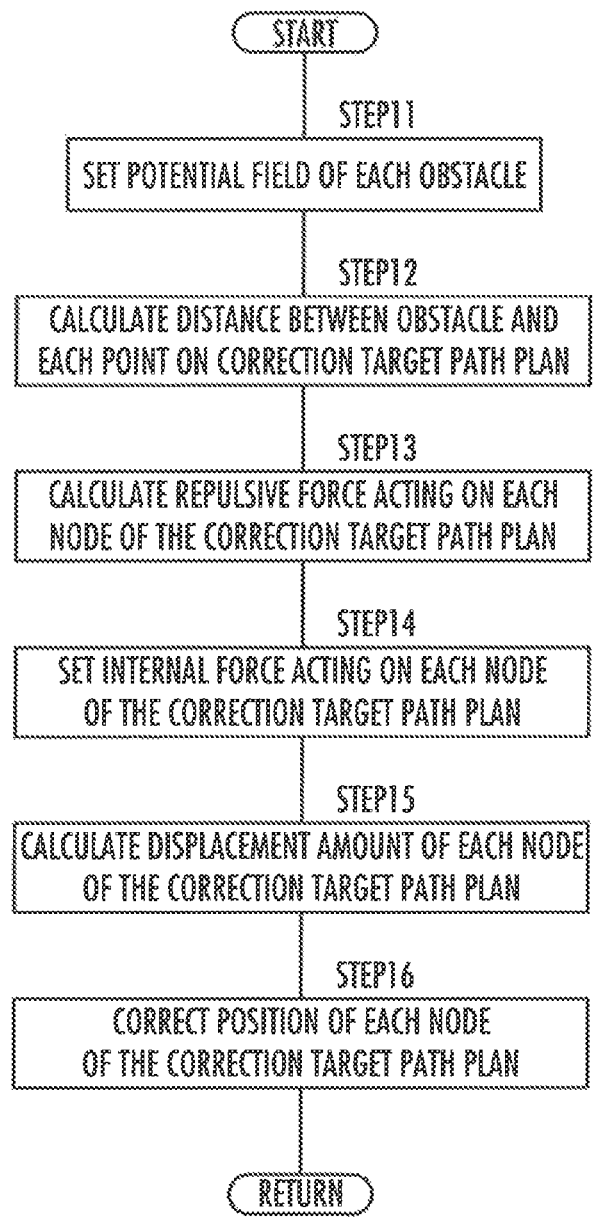
FIG. 13 is a flowchart illustrating processing performed by the path plan correcting section shown in FIG. 4.

Such processing in the path plan correcting section 23 is, more specifically, carried out at prescribed control processing cycles, as illustrated in the flowchart in FIG. 13.

In STEP 11, the path plan correcting section 23 sets a potential field of each obstacle A after the current time. In this case, the potential field of a fixed obstacle Aa or a stationary obstacle Ab is set as the field having a fixed position and fixed region. The potential field of a mobile obstacle Ac is set such that it moves along with the movement of the mobile obstacle Ac on the predicted path and such that the region of the potential field diminishes (and finally disappears) along with the decrease of the size of the existence region of the mobile obstacle Ac.

Next, in STEP 12, the path plan correcting section 23 calculates a distance between an obstacle A and each point (set at predetermined pitch width intervals) on the correction target path plan from the current position to the goal point of the mobile body 1. In this case, for a mobile obstacle Ac, the distance between each point on the correction target path plan and the point on the aforesaid predicted path at the corresponding time is calculated.

Next, in STEP 13, the path plan correcting section 23 calculates, for each node of the correction target path plan from the current position to the goal point, a repulsive force acting thereon by the potential field of an obstacle A.

More specifically, in the correction target path plan from the current position to the goal point, a section (hereinafter, referred to as "potential field acting section") in which the potential field(s) of one or more obstacles A will act is specified on the basis of the potential field set for each obstacle A in the STEP 11 and the distance calculated in the STEP 12. Then, from the distance between an obstacle A and each node (broken point on the correction target path plan) included in that potential field acting section, the repulsive force (vector) that acts on the node by the potential field of the obstacle A is calculated.

In this case, for any of the nodes in the potential field acting section on which potential fields of two or more obstacles A will act, repulsive forces corresponding respectively to the obstacles A are calculated.

Figure 14:
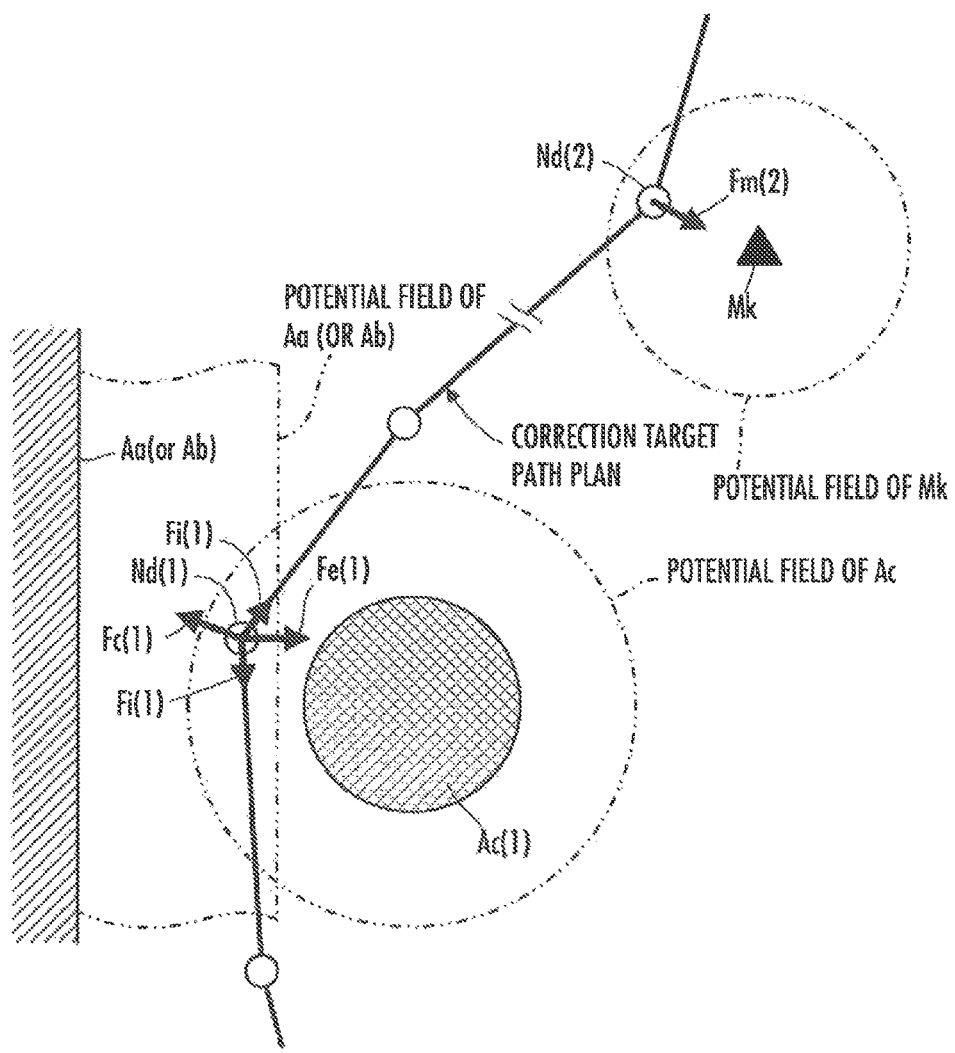
FIG. 14 illustrates the processing performed by the path plan correcting section shown in FIG. 4.

For example, FIG. 14 illustrates a state in which a potential field of a fixed obstacle Aa (or a stationary obstacle Ab) is acting on a node Nd(1) on a correction target path plan, and in which a potential field of a mobile obstacle Ac(1), which is in proximity to the node Nd(1) at the time corresponding to the node Nd(1), is also acting on the node Nd(1). In this case, a repulsive force Fe(1) (vector) that acts on the position of the node Nd(1) by the potential field of the fixed obstacle Aa (or the stationary obstacle Ab) and a repulsive force Fc(1) (vector) that acts on the position of the node Nd(1) by the potential field of the mobile obstacle Ac(1) are calculated.

For any node on the correction target path plan that does not belong to the potential field acting section, a repulsive force acting on the node is set to zero.

Supplementally, there is a case where no node has been set in the potential field acting section in the correction target path plan. In this case, the path plan correcting section 23 splits the correction target path plan within the potential field acting section, and newly adds an auxiliary node in that split position. The path plan correcting section 23 then calculates a repulsive force that acts on the auxiliary node by the potential field.

Next, in STEP 14, for each node (including, if any, the auxiliary node added in the STEP 13) on the correction target path plan from the current position to the goal point, the path plan correcting section 23 sets an internal force that acts between that node and the neighboring node.

This internal force is set to become a force that functions to make the node return to its original position in a state where the position of the node has been corrected from the position on the original correction target path plan (initial path plan generated by the initial path plan generating section 21 or RRT path plan generated by the RRT path plan generating section 22), or to become a force that functions to make the distance between that node and its neighboring node return to the original distance.

For example, in the case where the position of the node Nd(1) in FIG. 14 is a position that has been corrected from its original position to the side approaching the fixed obstacle Aa (or stationary obstacle Ab) due to the repulsive force by the potential field of the mobile obstacle Ac, an internal force Fi(1) (vector) acting between the node Nd(1) and its neighboring node on each side is set as illustrated in the figure.

It should be noted that for any node whose position is the same as the original position in the correction target path plan, the internal force acting thereon is set to zero.

Further, the internal force to be acted on each node is basically set to be sufficiently small in magnitude as compared to the maximum value of the repulsive force caused by the potential field of each obstacle A.

Next, in STEP 15, the path plan correcting section 23 calculates a displacement amount (corrected amount of position) of each node on the correction target path plan from the current position to the goal point.

In this case, the path plan correcting section 23 calculates the displacement amount (vector) of each node, assuming that the node is displaced elastically against the repulsive force and internal force acting thereon.

Specifically, in the present embodiment, the relationship between a repulsive force Fe caused by the potential field of a fixed obstacle Aa or a stationary obstacle Ab and a displacement amount dXe of the node on which the repulsive force Fe acts, the relationship between a repulsive force Fc caused by the potential field of a mobile obstacle Ac and a displacement amount dXc of the node on which the repulsive force Fc acts, and the relationship between an internal force Fi acting on a node and a displacement amount dXi of the node, are modelled by elastic models expressed respectively by the following expressions (1a), (1b), and (1c).

$$dXe = Fe/Ke \quad (1a)$$

$$dXc = Fc/Kc \quad (1b)$$

$$dXi = Fi/Ki \quad (1c)$$

In the above expressions, Ke, Kc, and Ki are constant values determined in advance as an equivalent of the so-called spring constant as the index value of the degree of stiffness. It should be noted that Ke, Kc, and Ki may take the same value.

The path plan correcting section 23 then calculates, for each node, a displacement amount dXn of the node, from the repulsive force and internal force calculated in the STEPs 13 and 14, respectively, by the following expression (2).

$$dXn = \Sigma Fe/Ke + \Sigma Fc/Kc + \Sigma Fi/Ki \quad (2)$$

It should be noted that $\Sigma Fe$ means the resultant force (vector) of any repulsive force Fe that acts on the node by the potential field of a fixed obstacle Aa or a stationary obstacle Ab, $\Sigma Fc$ means the resultant force (vector) of any repulsive force Fe that acts on the node by the potential field of a mobile obstacle Ac, and $\Sigma Fi$ means the resultant force (vector) of any internal force Fi that acts on the node.

By the above expression (2), the displacement amount dXn (vector) of each node in the potential field acting section is calculated such that the node is displaced elastically against the repulsive forces Fe, Fc and the internal force Fi.

For the node on which no repulsive force Fe, Fc and no internal force Fi acts, the displacement amount dXn of the node is zero.

Next, in STEP 16, the position of each node in the potential field acting section is corrected to a position displaced from the current position by the displacement amount dXn calculated in the STEP 15.

The path plan correcting section 23 sequentially carries out the above processing at prescribed control processing cycles.

With the above processing, in the correction target path plan from the current position to the goal point, i.e. the position of each node in the potential field acting section on which the potential field of an obstacle A acts, or the position of each node (displaced from its original position) on which an internal force acts, is corrected sequentially at prescribed control processing cycles.

In this case, for each node the position of which has been corrected by a repulsive force Fc caused by the potential field of a mobile obstacle Ac, even in the case where the potential field of the mobile obstacle Ac ceases to act (and hence the repulsive force Fc becomes zero) due to a change in moving velocity or moving direction of the mobile obstacle Ac or the like, the node is gradually returned to its original position by the internal force Fi. It is therefore possible to correct the correction target path plan in such a manner that the corrected path plan will not diverge noticeably from the original correction target path plan.

Figure 15:
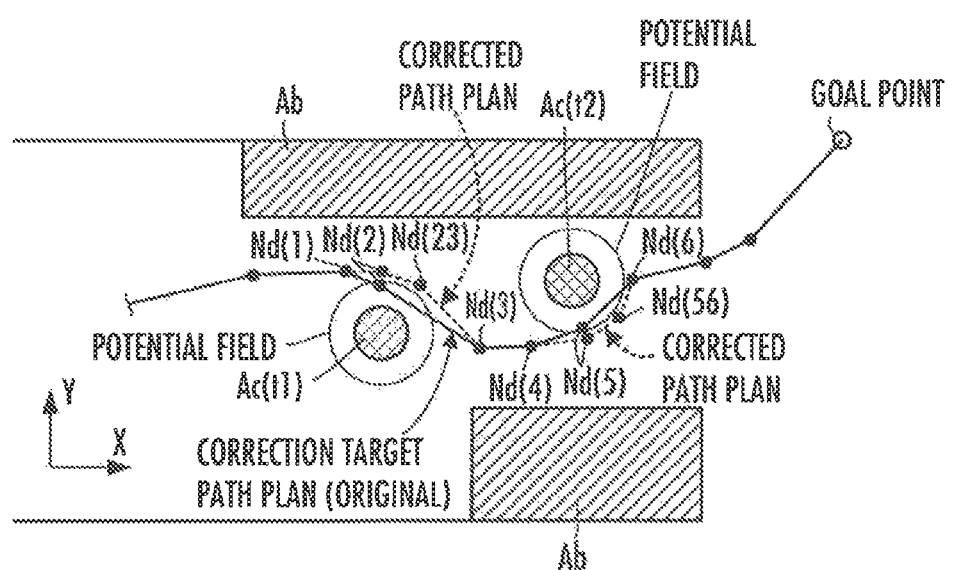
FIG. 15 shows, by way of example, how a path plan is corrected by the processing in the path plan correcting section shown in FIG. 4.

FIG. 15 shows, by way of example, how a correction target path plan is corrected by the processing in the path plan correcting section 23. In this figure, each hatched region indicates the existence region of a stationary obstacle Ab, and Ac(t1) and Ac(t2) indicate the existence region of a mobile obstacle Ac at times t1 and t2, respectively.

In this example, although the potential fields of the stationary obstacles Ab do not act on the correction target path plan, around the time t1, the potential field of the mobile obstacle Ac acts in the section from the node Nd(1) to the node Nd(3), and around the time t2, the potential field of the mobile obstacle Ac acts in the section from the node Nd(4) to the node Nd(6).

In this case, the original correction target path plan, shown by the solid line in FIG. 15, is corrected for example as shown by the broken lines in the section from the node Nd(1) to the node Nd(3) and in the section from the node Nd(4) to the node Nd(6). In this example, even if the node Nd(2) alone is displaced in the section from the node Nd(1) to the node Nd(3), the potential field of the mobile obstacle Ac around the time t1 will act between the nodes Nd(2) and Nd(3), so an auxiliary node Nd(23) has been added between the nodes Nd(2) and Nd(3). Similarly, an auxiliary node Nd(56) has been added between the nodes Nd(5) and Nd(6) in the section from the node Nd(4) to the node Nd(6).

Supplementally, in the case where the potential field of the mobile obstacle Ac ceases to act in the section from the node Nd(1) to the node Nd(3) or in the section from the node Nd(4) to the node Nd(6) due to a change in moving velocity or moving direction of the mobile obstacle Ac or the like, the path plan in that section is returned to the original state in the correction target path plan by the internal force explained earlier.

Incidentally, in a case where a marker Mk for use in estimating the self-position of the mobile body 1 has been disposed in the operating environment, it is preferable that the mobile body 1 is moved to approach the marker Mk as long as no interference will occur between the mobile body 1 and an obstacle A.

Thus, in the present embodiment, as illustrated in FIG. 14, the path plan correcting section 23 sets, in a circumference of the marker Mk (within the range of a predetermined distance from the marker Mk), a potential field in which an attractive force Fm (vector) is generated in a direction bringing closer to the marker Mk. In this case, the magnitude of the attractive force Fm in the potential field may be constant, or may change in accordance with the distance from the marker Mk.

Then, the path plan correcting section 23 causes the attractive force Fm (in FIG. 14, Fm(2)) of the marker Mk to act on a node (for example, the node Nd(2) shown in FIG. 14), among the nodes on the correction target path plan, on which repulsive forces Fe, Fc by the potential fields of the obstacles A will not act and on which the attractive force Fm by the potential field of the marker Mk will act.

The path plan correcting section 23 then corrects the position of the node by a displacement amount dXm determined in accordance with that attractive force Fm. The displacement amount dXm in this case may be calculated as a value obtained by dividing the attractive force Fm by a spring constant Km of a predetermined value, for example, as in the aforesaid expressions (1a) to (1c).

In this case, alternatively, the displacement amount dXm of the node may be determined by causing the internal force Fi to act on the node in addition to the attractive force Fm, and by combining the displacement amounts according respectively to the attractive force Fm and the internal force Fi.

By doing so, among the nodes on the correction target path plan on which no repulsive force will act by the potential field of any obstacle A, one or more nodes relatively close to the marker Mk can further be brought closer to the marker Mk. Thus, when the mobile body 1 is moved around such a node, the self-position of the mobile body 1 can be estimated appropriately by using the marker Mk. This can increase the estimate accuracy of the self-position of the mobile body 1.

The above has described in detail the processing performed by the path plan correcting section 23.

Overall Processing in Path Plan Generating Processor 12

Overall processing performed by the path plan generating processor 12 will now be described. The path plan generating processor 12 sequentially performs, at prescribed control processing cycles, processing of selecting which processing to carry out among the initial path plan generating section 21, the RRT path plan generating section 22, and the path plan correcting section 23. The path plan generating processor 12 then carries out the selected processing to generate or correct a path plan.

Figure 16:
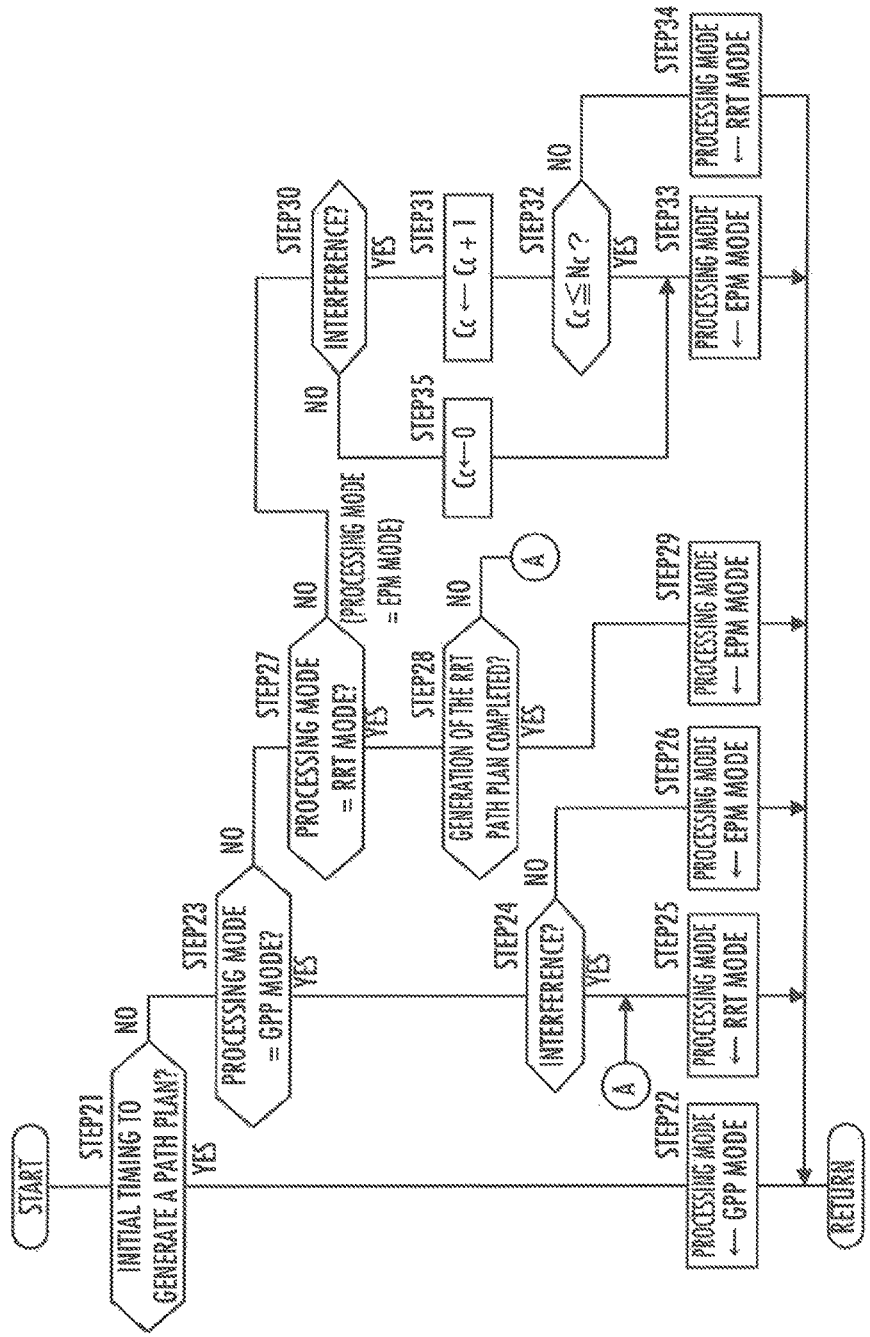
FIG. 16 is a flowchart illustrating processing performed by the path plan generating processor shown in FIG. 4.

In this case, the processing of selecting which processing to carry out among the initial path plan generating section 21, the RRT path plan generating section 22, and the path plan correcting section 23 is performed as shown by the flowchart in FIG. 16. In the following description, the mode of executing the processing in the initial path plan generating section 21 will be referred to as "GPP mode" (GPP: Global Path Planning), the mode of executing the processing in the RRT path plan generating section 22 will be referred to as "RRT mode", and the mode of executing the processing in the path plan correcting section 23 will be referred to as "EPM mode" (EPM: Elastic Potential Method).

First, in STEP 21, the path plan generating processor 12 determines whether it is the initial timing of generating a path plan for the mobile body 1. The initial timing is, for example, a timing to start anew movement of the mobile body 1 according to a move request, or a timing immediately before that timing.

If the determination result in the STEP 21 is positive, in STEP 22, the path plan generating processor 12 selects the GPP mode as the processing mode. At this time, the path plan generating processor 12 causes the initial path plan generating section 21 to perform the processing as explained above. In this manner, the initial path plan from the initial position (start point) to the goal point of the mobile body 1 is generated.

If the determination result in the STEP 21 is negative, in STEP 23, the path plan generating processor 12 determines whether the current processing mode (processing mode selected in the last time's control processing cycle) is the GPP mode.

If the determination result in the STEP 23 is positive, in STEP 24, the path plan generating processor 12 further determines whether the initial path plan generated by the initial path plan generating section 21 in the last times control processing cycle is a path plan with which interference between the mobile body 1 and an obstacle A will occur in the future after the current time.

This determining processing is performed on the initial path plan already generated, by the interference determining processor 24 in the above-described manner.

If the determination result in the STEP 24 is positive (in the case where it is predicted that interference will occur between the mobile body 1 and an obstacle A on the initial path plan), in STEP 25, the path plan generating processor 12 selects the RRT mode as the processing mode. At this time, the path plan generating processor 12 causes the RRT path plan generating section 22 to perform the processing as explained above. In this manner, the RRT path plan from the current position to the goal position of the mobile body 1 is newly generated.

On the other hand, if the determination result in the STEP 24 is negative (in the case where it is predicted that no interference will occur between the mobile body 1 and an obstacle A on the initial path plan), in STEP 26, the path plan generating processor 12 selects the EPM mode as the processing mode. At this time, the path plan generating processor 12 causes the path plan correcting section 23 to perform the processing as explained above, with the initial path plan as the correction target path plan. In this manner, the initial path plan is corrected to avoid interference between the mobile body 1 and an obstacle A. Thereafter, the processing of correcting the initial path plan is continually performed by the path plan correcting section 23 as long as the processing mode is maintained at the EPM mode.

If the determination result in the STEP 23 is negative (if the current processing mode is not the GPP mode), in STEP 27, the path plan generating processor 12 further determines whether the current processing mode is the RRT mode.

If the determination result in the STEP 27 is positive, in STEP 28, the path plan generating processor 12 further determines whether the generation of an RRT path plan has been completed.

In the processing in the RRT path plan generating section 22, a new node Nd_new of the search tree is generated randomly, so it may take some time to complete the generation of the RRT path plan (until a suitable RRT path plan is selected ultimately from a plurality of RRT path plans).

In such a case, the determination result in the STEP 28 becomes negative. In this case, in the STEP 25 described above, the path plan generating processor 12 selects the RRT mode as the processing mode continuously. The processing in the RRT path plan generating section 22 is then continued, or it is performed afresh.

If the determination result in the STEP 28 is positive (if the generation of the RRT path plan has been completed in the last time's control processing cycle), in STEP 29, the path plan generating processor 12 selects the EPM mode as the processing mode. At this time, the path plan generating processor 12 causes the path plan correcting section 23 to perform the processing as explained above, with the RRT path plan generated being the correction target path plan. In this manner, the RRT path plan is corrected so as to avoid interference between the mobile body 1 and an obstacle A. Thereafter, the processing of correcting the RRT path plan is continually performed by the path plan correcting section 23 as long as the processing mode is maintained at the EPM mode.

The determination result in the STEP 27 becomes negative when the current processing mode is the EPM mode.

In this case, in STEP 30, the path plan generating processor 12 determines whether the path plan that has been corrected by the processing in the path plan correcting section 23 is a path plan with which interference between the mobile body 1 and an obstacle A will occur in the future after the current time.

This determining processing is performed on the corrected path plan, by the interference determining processor 24 as explained above.

Here, the processing in the path plan correcting section 23 (processing in the EPM mode) in the last time's control processing cycle has basically been performed to correct the path plan so as to avoid occurrence of interference between the mobile body 1 and an obstacle A. However, with a change in moving velocity or moving direction of the mobile obstacle Ac or the like, occurrence of interference between the mobile body 1 and the mobile obstacle Ac may be predicted, or when the corrected path plan becomes sandwiched between the existence region of the mobile obstacle Ac and the existence region of another obstacle A (Aa or Ab or Ac), occurrence of interference between the mobile body 1 and both of the mobile obstacle Ac and the other obstacle A may be predicted.

Further, in the case where the correction target path plan is the initial path plan, the correction amount of the initial path plan (displacement amount of the position of the node) by the processing in the path plan correcting section 23 may be insufficient, in which case the corrected path plan may still cause interference between the mobile body 1 and an obstacle A.

The determination result in the STEP 30 becomes positive in such cases. Then, in STEP 31, the path plan generating processor 12 increments, by one, the value of an interference determination counter Cc that indicates the consecutive number of times it is repeatedly determined that interference will occur between the mobile body 1 and an obstacle A.

It should be noted that the value of the interference determination counter Cc is initialized to zero when the processing mode is switched from the GPP mode or the RRT mode to the EPM mode.

Further, in STEP 32, the path plan generating processor 12 determines whether the value of the interference determination counter Cc is not greater than a prescribed value Nc determined in advance.

If the determination result in the STEP 32 is positive (when Cc≤Nc), in STEP 33, the path plan generating processor 12 selects the EPM mode as the processing mode continuously. At this time, the processing of correcting the path plan is performed continually by the path plan correcting section 23.

If the determination result in the STEP 32 becomes negative with the number of times (=Cc) the determination result in the STEP 30 consecutively becomes positive has exceeded the prescribed value Nc (i.e. when Cc>Nc), it may be considered that the processing by the path plan correcting section 23 will not be able to correct the path plan so as to avoid the interference between the mobile body 1 and an obstacle A.

Thus, in such a case, in STEP 34, the path plan generating processor 12 selects the RRT mode as the processing mode. At this time, an RRT path plan from the current position to the goal point is newly generated by the RRT path plan generating section 22. In this case, when the generation of the new RRT path plan is completed, the path plan corrected in the EPM mode is discarded.

Further, if the determination result in the STEP 30 is negative (if the path plan that has been corrected by the path plan correcting section 23 is a path plan with which it is predicted that no interference will occur between the mobile body 1 and an obstacle A), in STEP 35, the path plan generating processor 12 resets the value of the interference determination counter Cc to zero, and then, in the STEP 33 described above, the path plan generating processor 12 selects the EPM mode as the processing mode continuously. At this time, the processing of correcting the path plan is performed continually by the path plan correcting section 23.

As described above, the path plan generating processor 12 sequentially selects a processing mode and carries out processing corresponding to the selected mode (processing in the initial path plan generating section 21, processing in the RRT path plan generating section 22, or processing in the path plan correcting section 23). In this manner, a path plan is generated or corrected so as to be able to avoid interference between the mobile body 1 and an obstacle A as much as possible, while reflecting the moving state of a mobile obstacle Ac.

In this case, in the path plan generating processor 12, in a situation where it is predicted that there will be no future interference between the mobile body 1 and an obstacle A (situation where the determination result in the STEP 24 or 30 becomes negative, or situation where the determination result in the STEP 28 becomes positive) or in a situation where there is a possibility that the situation where it is predicted that such interference will occur may change to the situation where it is predicted that no such interference will occur (situation where the determination result in the STEP 32 becomes positive) in the initial path plan generated by the initial path plan generating section 21 at the initial timing (or the initial path plan corrected by the path plan correcting section 23) or in the RRT path plan generated by the RRT path plan generating section 22 during movement of the mobile body 1 (or the RRT path plan corrected by the path plan correcting section 23), the processing of correcting the initial path plan or the RRT path plan is sequentially performed by the path plan correcting section 23.

In this manner, the initial path plan or the RRT path plan is corrected, by the technique of the potential method of generating a repulsive force by the potential field of an obstacle A, so as to be able to avoid occurrence of future interference between the mobile body 1 and the obstacle A as much as possible. In this case, the path plan is corrected particularly using the potential field of a mobile obstacle Ac that is set in correspondence with a latest predicted path of the mobile obstacle Ac, with the predicted path being sequentially updated in accordance with the estimate of the moving velocity of the mobile obstacle Ac.

It is therefore possible to dynamically correct the path plan while reflecting the actual moving state of the mobile obstacle Ac in real time.

Further, in the path plan generating processor 12, in the case where it becomes no longer possible to generate a path plan that can avoid interference between the mobile body 1 and an obstacle A by the processing in the path plan correcting section 23 due to a change in moving state of the mobile obstacle Ac or the like (in the case where the determination result in the STEP 32 becomes negative), an RRT path plan is newly generated by the RRT path plan generating section 22.

In this manner, even in the case where it becomes no longer possible to generate a path plan that can avoid interference between the mobile body 1 and an obstacle A with the technique of the potential method, it is possible to generate a path plan that can avoid interference between the mobile body 1 and an obstacle A afresh, with the technique of the RRT algorithm.

An exemplary manner of generating and correcting a path plan by the processing in the path plan generating processor 12 is illustrated in FIGS. 17 to 21. FIGS. 17 to 21 illustrate a path plan for causing the mobile body 1 to move from a start point Ps (initial position) to a goal point Pg on a flat floor surface (on the XY plane) in an operating environment AR.

In FIGS. 17 to 21, B1 represents a passing area of the existence region of the mobile body 1, and Bac represents a passing area of the existence region (the size of which is decreased over time) of a mobile obstacle Ac. The region with the reference characters 1(ti) (where "ti" is a variable representing time) indicates the existence region of the mobile body 1 at time ti, and the region with the reference characters Ac(ti) indicates the existence region of the mobile obstacle Ac at the time ti. Further, in FIGS. 17 to 21, a path plan with which no interference will occur between the mobile body 1 and a fixed obstacle Aa or stationary obstacle Ab is shown for convenience sake.

Figure 17:
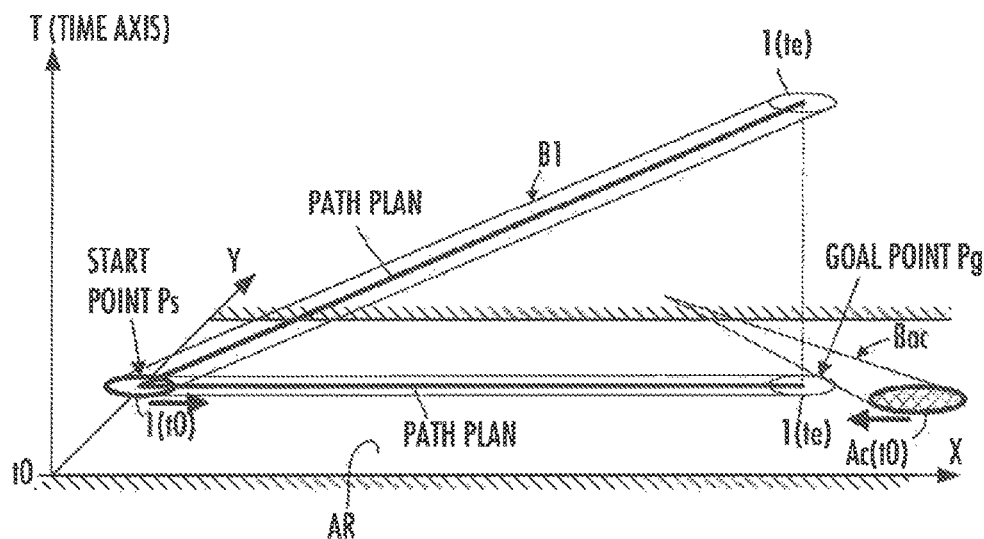
FIG. 17 shows, by way of example, a path plan initially generated at time t0.

FIG. 17 illustrates an initial path plan from a start point Ps to a goal point Pg, which has been generated by the initial path plan generating section 21 at the initial timing of starting generation of the path plan. In this example, the initial path plan is generated to cause the mobile body to move straight from the start point Ps to the goal point Pg. In this figure, time t0 is a time at which the mobile body 1 starts moving, and te is a time at which the mobile body 1 arrives at the goal point Pg.

At the time point shown in FIG. 17, the initial path plan has been generated such that there will be no overlap between the existence region of the mobile body 1 and the existence region of the mobile obstacle Ac (such that no interference will occur between the mobile body 1 and the mobile obstacle Ac) at each time on the initial path plan.

Figure 18:
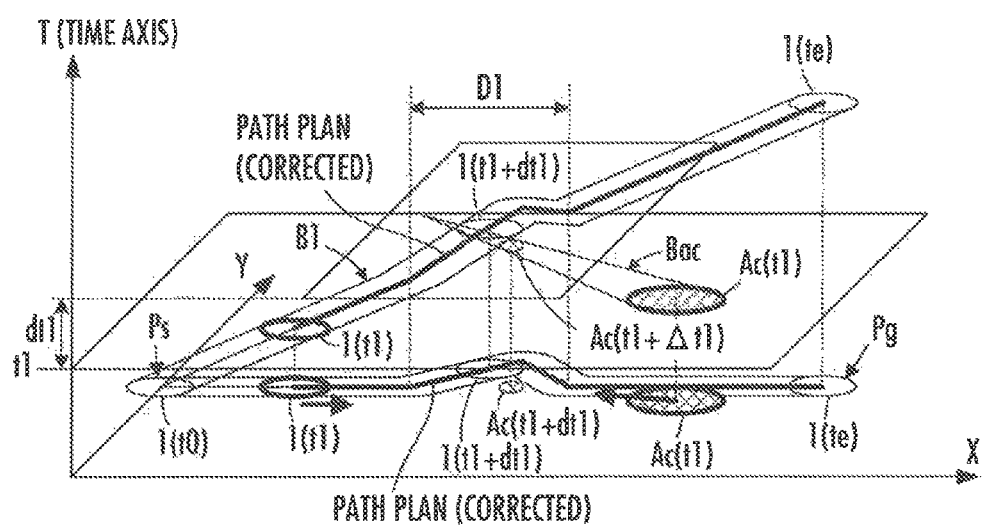
FIG. 18 shows, by way of example, a path plan corrected at time t1 after the time t0.

Next, FIG. 18 illustrates a path plan which has been corrected by the processing in the path plan correcting section 23 at time t1 later than in FIG. 17. In this case, for example, it is predicted that, at a future time t1+dt1, the existence region 1(t1+dt1) of the mobile body 1 will approach the existence region Ac(t1+dt1) of the mobile obstacle Ac (or, the potential field of the mobile obstacle Ac will act on the mobile body 1). Thus, in a section D1 around the time t1+dt1, the path plan has been corrected, as shown in the figure, from the original path plan determined in the control processing cycle immediately before the time t1.

While the initial path plan shown in FIG. 17 has been assumed as the original path plan in the illustrated example, the original path plan may be an RRT path plan generated by the RRT path plan generating section 22, or a path plan corrected by the path plan correcting section 23, at a time earlier than the time t1.

Figure 19:
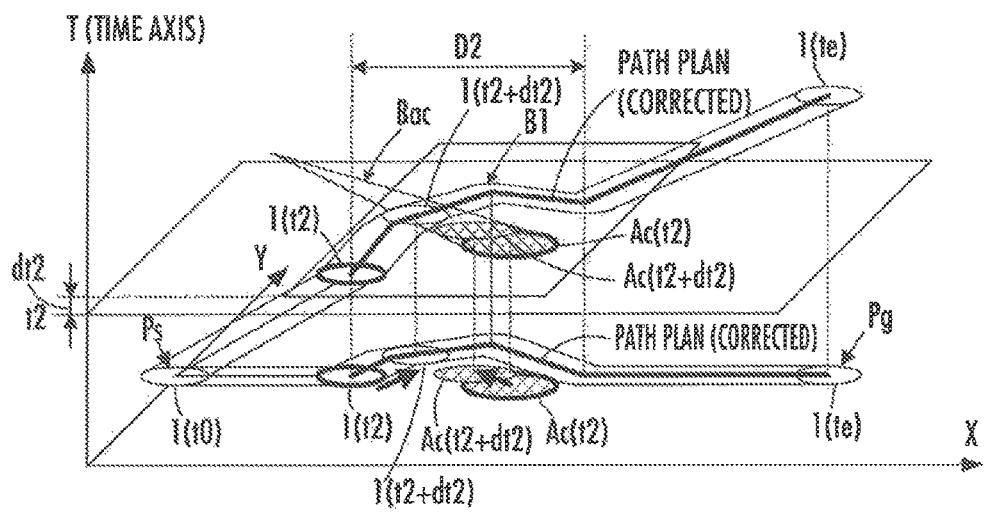
FIG. 19 shows, by way of example, a path plan corrected at time t2 after the time t1.

Next, FIG. 19 illustrates a path plan which has been corrected by the processing in the path plan correcting section 23 at time t2 later than in FIG. 18. In this case, for example, it is predicted that, at a future time t2+dt2, the existence region 1(t2+dt2) of the mobile body 1 will approach the existence region Ac(t2+dt2) of the mobile obstacle AC (or, the potential field of the mobile obstacle Ac will act on the mobile body 1). Thus, in a section D2 around the time t2+dt2, the path plan has been corrected, as shown in the figure, from the original path plan determined in the control processing cycle immediately before the time t2.

Figure 20:
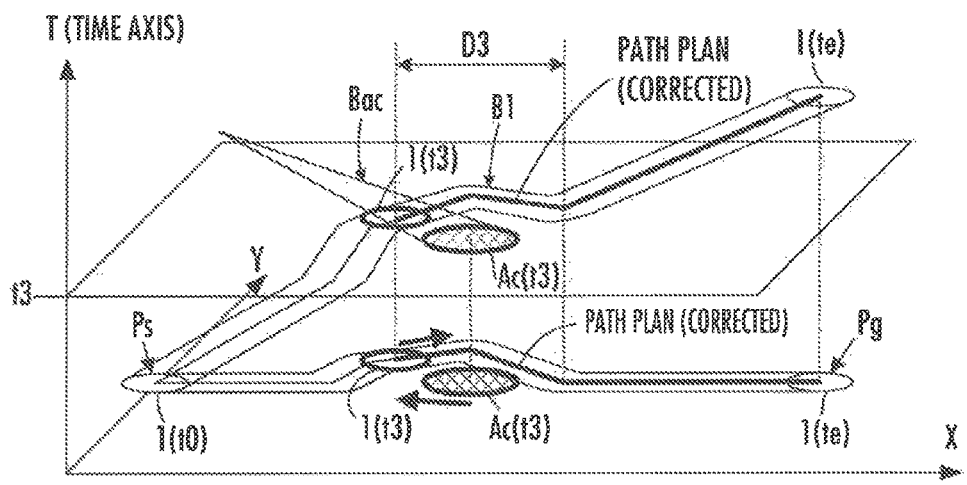
FIG. 20 shows, by way of example, a path plan corrected at time t3 after the time t2.

Next, FIG. 20 illustrates a path plan which has been corrected by the processing in the path plan correcting section 23 at time t3 later than in FIG. 19. In this case, for example, it is predicted that there will occur interference between the mobile body 1 and the mobile obstacle Ac (or, their existence regions will overlap with each other) immediately after the current time t3. Thus, in a section D3 immediately after the time t3, the path plan has been corrected, as shown in the figure, from the original path plan determined in the control processing cycle immediately before the time t3.

Next, FIG. 21 illustrates a path plan which has been corrected by the processing in the path plan correcting section 23 at time t4 later than in FIG. 20. In this case, it is predicted that the mobile body 1 and the mobile obstacle Ac will be sufficiently apart from each other (or, the potential field of the mobile obstacle Ac will not act on the mobile body 1) after the current time t4. Thus, the path plan after the time t4 remains unchanged from the original path plan determined in the control processing cycle immediately before the time t4.

It should be noted that the position on the path plan that has been corrected to protrude in the lateral direction (Y axis direction) at the time t2 in FIG. 19 or at the time t3 in FIG. 20, for example, may approach a fixed obstacle Aa or stationary obstacle Ab, in which case the corrected path plan may be sandwiched between the mobile obstacle Ac and the fixed obstacle Aa or stationary obstacle Ab as it passes through the existence regions of both the mobile obstacle Ac and the fixed obstacle Aa or stationary obstacle Ab, as illustrated in FIG. 22A, for example.

In such a case, with the processing in the path plan correcting section 23, it will become impossible to correct the path plan so as to avoid the interference between the mobile body 1 and the mobile obstacle Ac as well as the interference between the mobile body 1 and the fixed obstacle Aa or stationary obstacle Ab.

The determination result in the STEP 32 in the flowchart in FIG. 16 thus becomes negative, and the processing mode is switched to the RRT mode. Consequently, an RRT path plan from the current position to the goal point is newly generated by the RRT path plan generating section 22, in accordance with the RRT algorithm. The same applies to the case where the path plan is sandwiched between two mobile obstacles Ac and Ac, as illustrated in FIG. 22B, for example.

Processing in Move Command Section 13

Processing performed by the move command section 13 will now be described. The move command section 13 outputs a move command, such as a moving velocity, to an operation controlling device (not shown) of the mobile body 1, so as to cause the mobile body 1 to move in accordance with a latest path plan determined (generated or corrected) by the processing in the path plan generating processor 12 described above.

In this case, in the present embodiment, even in the case where the latest path plan is a path plan with which it is predicted by the interference determining processor 24 that interference will occur between the mobile body 1 and an obstacle A, a move command is output to the mobile body 1 so as to cause the mobile body 1 to move in accordance with the path plan until the time immediately before the time at which it is predicted that the existence region of the mobile body 1 and the existence region of the obstacle A will interfere (overlap).

More specifically, in the present embodiment, the move command section 13 determines, in accordance with the command value of a moving velocity of the mobile body 1, a braking distance necessary to stop the mobile body 1 from the moving velocity corresponding to the command value, by using an arithmetic expression or data table created in advance. The braking distance is determined to become larger as the command value of the moving velocity of the mobile body 1 is larger. The braking distance may allow for influences such as a communication delay between the path plan generating apparatus 10 and the operation controlling device of the mobile body 1.

Figure 23:
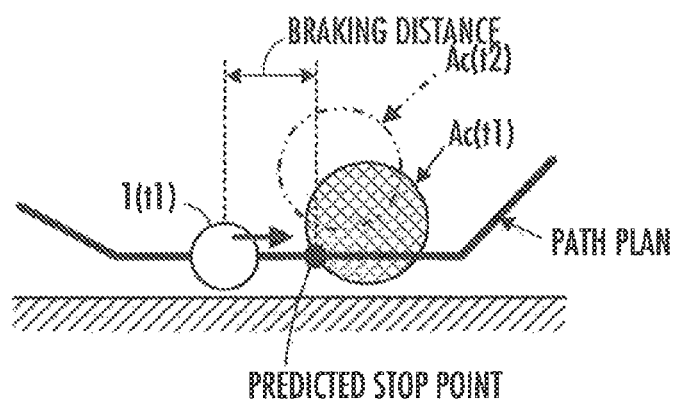
FIG. 23 illustrates processing performed by the move command section shown in FIG. 4.

Then, as illustrated in FIG. 23, the move command section 13 outputs a command to stop the mobile body 1 at a time (in the illustrated example, at time t1) when a predicted stop point, which is a point shifted by the braking distance frontward in the traveling direction from the current position of the mobile body 1 on the path plan, is to enter the existence region of an obstacle A (in the illustrated example, the existence region Ac(t1) (cross-hatched region) of a mobile obstacle Ac). It should be noted that the region with the reference characters 1(t1) indicates the existence region of the mobile body 1 at the time t1.

In this manner, the move command section 13 outputs a command to stop the mobile body 1 to the operation controlling device of the mobile body 1, such that the mobile body 1 is able to stop immediately before the existence region of the mobile body 1 interferes with the existence region of the obstacle A.

Thereafter, once the existence region of the mobile body 1 and the predicted stop point both have escaped from the existence region of the obstacle A, for example in the case where the existence region of the mobile obstacle Ac has moved as indicated by the region Ac(t2) delimited by the double dot-dash line in FIG. 23, the mobile body 1 is able to resume the movement.

In the embodiment described above, the processing of generating the RRT path plan is limited to the following two cases: the case where it is predicted that interference will occur between the mobile body 1 on the initial path plan and an obstacle A (when the determination result in the STEP 24 becomes positive); and the case where it has become impossible to generate a path plan that can avoid interference between the mobile body 1 and an obstacle A with the processing by the path plan correcting section 23 (when the determination result in the STEP 32 becomes negative).

For the cases other than the above two cases, except the case where an initial path plan is generated for the first time, the initial path plan or the RRT path plan is dynamically corrected by the path plan correcting section 23 using the technique based on the potential method, so as to reflect a change in moving state of the mobile obstacle Ac and the like.

It is therefore possible to prevent as much as possible the path plan from being changed excessively, while limiting the generation of an RRT path plan to the minimum necessary.

The existence region of a mobile obstacle Ac is set to be decreased as described above. This can prevent, as much as possible, the interference determining processor 24 from determining that interference will occur between the mobile body 1 and the mobile obstacle Ac in the state where the mobile body 1 and the mobile obstacle Ac are distant from each other.

Further, with the decrease in size of the mobile obstacle Ac, the region of the potential field is also reduced in size. This can prevent the path plan correcting section 23 from correcting the path plan more than necessary.

As a result, it is possible to enhance the stability of the path plan for use in movement of the mobile body 1, while preventing a relatively large change in the path plan as much as possible.

Modifications

The present invention is not limited to the embodiment described above. Several modifications will be described below.

In the above embodiment, the case of generating a path plan in a two-dimensional domain was described as a primary example. Alternatively, it is of course possible to generate a path plan in a three-dimensional domain by using three-dimensional regions as the existence regions of the mobile body 1 and each obstacle A.

In the above embodiment, a legged mobile robot was shown as an example of the mobile body 1. The mobile body 1, however, may be another mobile body as long as it can be moved in accordance with a path plan. For example, the mobile body 1 may be a vehicle, a flying object, a ship, a transfer carriage, or a tip end of a movable arm for a work machine such as an industrial robot.

Further, in the processing in the RRT path plan generating section 22, instead of generating a plurality of candidates for an RRT path plan, a single RRT path plan may be generated for output.

What is claimed is:

1. A path plan generating apparatus for a mobile body, comprising:
    an obstacle information acquiring section which acquires obstacle information including at least information indicating an existence position of each obstacle present in an operating environment of the mobile body;
    an initial path plan generating section which generates an initial path plan that is a path plan from an initial position, where the mobile body starts moving, to a goal point;
    an RRT path plan generating section which is operable, in a case where future occurrence of interference between the mobile body on the initial path plan and any obstacle is predicted based on the initial path plan and the obstacle information, to generate a path plan from a current position of the mobile body to the goal point, by processing based on an rapidly-exploring random tree (RRT) algorithm, so as to be able to avoid future interference between the mobile body and each obstacle; and
    a path plan correcting section which sets, using the obstacle information, a potential field that generates a virtual repulsive force in a region surrounding each obstacle, and, in a case where a generated path plan includes a section that is predicted to be affected by the potential field of at least one obstacle, corrects the generated path plan, by processing based on a potential method, so as to reduce the repulsive force acting on the section from the potential field, the path plan correcting section sequentially performing the correction on at least an RRT path plan among the initial path plan and the RRT path plan, the RRT path plan being a path plan generated by the RRT path plan generating section.

2. The path plan generating apparatus for the mobile body according to claim 1, wherein the path plan correcting section is configured to sequentially perform the correction on the initial path plan by the processing based on the potential method, after the initial path plan is generated by the initial path plan generating section, until the RRT path plan is generated by the RRT path plan generating section.

3. The path plan generating apparatus for the mobile body according to claim 1, wherein
    the RRT path plan generating section is configured to further have a function of newly generating the RRT path plan in a case where it is predicted based on the path plan corrected by the path plan correcting section and the obstacle information that interference between the mobile body on the corrected path plan and an obstacle is unavoidable, and
    the path plan correcting section is configured, in a case where the RRT path plan has been newly generated by the RRT path plan generating section, to sequentially perform the correction on the new RRT path plan by the processing based on the potential method.

4. The path plan generating apparatus for the mobile body according to claim 3, wherein
    the path plan correcting section is configured to sequentially perform the correction on the generated path plan by the processing based on the potential method at prescribed control processing cycles, and
    the case where it is predicted that interference between the mobile body on the corrected path plan and an obstacle is unavoidable is a case where the corrected path plan with which future occurrence of interference between the mobile body and an obstacle is predicted has been generated repeatedly in a predetermined number of control processing cycles of the path plan correcting section.

5. The path plan generating apparatus for the mobile body according to claim 1, wherein the path plan correcting section is configured to correct a path plan in the section of the generated path plan by displacing at least one node set in the section by a displacement amount determined in accordance with at least a repulsive force acting from the potential field of the obstacle.

6. The path plan generating apparatus for the mobile body according to claim 5, wherein the path plan correcting section is configured, in a case where it is predicted, after the correction of the path plan in the section, that the potential field will cease to act on the section, to cause the section to gradually return to a state before being corrected.

7. The path plan generating apparatus for the mobile body according to claim 1, further comprising an interference determining section which determines whether interference will occur between the mobile body on a target path plan and a mobile obstacle among the obstacles in accordance with whether there will be an overlap between an existence region of the mobile body on the target path plan and an existence region of each obstacle set based on the obstacle information, the target path plan being any one of the initial path plan, the RRT path plan, and the path plan corrected by the path plan correcting section, wherein the interference determining section is configured to set, as a future existence region of the mobile obstacle for use in determining whether interference will occur between the mobile body and the mobile obstacle, in such a manner that a size of the existence region will be decreased to zero over time.

8. The path plan generating apparatus for the mobile body according to claim 7, wherein the path plan correcting section is configured to set a future region of a potential field of the mobile obstacle in such a manner that the region will be reduced in size along with the decrease of the size of the existence region of the mobile obstacle.

\* \* \* \* \*